US012771476B2

(12) United States Patent
Barik et al.

(10) Patent No.: US 12,771,476 B2
(45) Date of Patent: Oct. 20, 2026

(54) CODE BLOCK GROUP AND CODE BLOCK BUNDLE ALIGNMENT SIGNALING

(71) Applicant: QUALCOMM Incorporated, San Diego, CA (US)

(72) Inventors: Somsubhra Barik, San Diego, CA (US); Jing Sun, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/595,247

(22) Filed: Mar. 4, 2024

(65) Prior Publication Data

US 2025/0279847 A1 Sep. 4, 2025

(51) Int. Cl.
*H04L 1/00* (2006.01)
*H04W 8/22* (2009.01)

(52) U.S. Cl.
CPC .......... *H04L 1/0057* (2013.01); *H04L 1/0071* (2013.01); *H04W 8/22* (2013.01)

(58) Field of Classification Search
CPC ............... H04W 72/23; H04W 72/232; H04W 74/0833; H04W 72/0446; H04W 72/20; H04W 72/0453; H04W 24/10; H04W 72/12; H04W 72/1263; H04W 56/0015; H04W 76/27; H04W 72/1273; H04W 72/0466; H03M 13/251; H04L 5/0048; H04L 5/0044; H04L 5/0053; H04L 1/0057; H04L 1/1845; H04L 1/0056; H04L 1/1816; H04L 27/26
See application file for complete search history.

(56) References Cited

U.S. PATENT DOCUMENTS

2018/0278324 A1* 9/2018 Qin .................... H04W 28/082
2022/0417919 A1* 12/2022 Shin ...................... H04W 72/40
2023/0397190 A1* 12/2023 Eriksson ........... H04W 72/1263

FOREIGN PATENT DOCUMENTS

CN 110582967 A * 12/2019 ........... H04L 1/1887

* cited by examiner

*Primary Examiner* — Khalid W Shaheed
(74) *Attorney, Agent, or Firm* — QUALCOMM Incorporated

(57) ABSTRACT

A wireless device may receive a code block bundle (CBB) grouping algorithm indicator. The wireless device may calculate a CBB configuration based on the CBB grouping algorithm indicator. The wireless device may transmit a first plurality of CBBs based on the calculated CBB configuration. Each code block group (CBG) of a second plurality of CBGs may be associated with a subset of the first plurality of CBBs. Each code block bundle (CBB) of the first plurality of CBBs may be associated with exactly one of the second plurality of CBGs. To transmit the first plurality of CBBs based on the calculated CBB configuration, the wireless device may interleave code blocks (CBs) associated with each CBB of the first plurality of CBBs. The wireless device may further transmit the interleaved CBs. The transmissions based on the CBB grouping algorithm may apply to both uplink (UL) transmissions and to downlink (DL) transmissions.

17 Claims, 17 Drawing Sheets

1400

200
One Frame (TDD) 10 ms
subframe
slot
RB
subcarrier
OFDM symbol
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
SRS
SRS Comb 0
SRS Comb 1

280
PUCCH
PUSCH

FIG. 4
CBB 408
CBB interleaving
RB0
RB1
RB2
RB3
RB4
RB5
RB6
RB7
CB 402
CB 404
CB 406
400

CODE BLOCK GROUP AND CODE BLOCK BUNDLE ALIGNMENT SIGNALING

TECHNICAL FIELD

The present disclosure relates generally to communication systems, and more particularly, to a wireless system for bundling code blocks for transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a code block bundle (CBB) grouping algorithm indicator. The apparatus may calculate a CBB configuration based on the CBB grouping algorithm indicator. The apparatus may transmit a first plurality of CBBs based on the calculated CBB configuration. Each code block group (CBG) of a second plurality of CBGs may be associated with a subset of the first plurality of CBBs. Each CBB of the first plurality of CBBs may be associated with exactly one of the second plurality of CBGs.

In an aspect of the disclosure, a method, a computer-readable medium, and an apparatus are provided. The apparatus may include a network node. The apparatus may transmit a CBB grouping algorithm indicator. The apparatus may receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs.

In some aspects, the techniques described herein relate to a method of wireless communication at a UE, including: receiving a CBB grouping algorithm indicator; calculating a CBB configuration based on the CBB grouping algorithm indicator; and transmitting a first plurality of CBBs based on the calculated CBB configuration, where each CBG of a second plurality of CBGs is associated with a subset of the first plurality of CBBs, where each CBB of the first plurality of CBBs is associated with exactly one of the second plurality of CBGs.

In some aspects, the techniques described herein relate to a method, where the CBB grouping algorithm indicator indicates the UE to associate code blocks (CBs) with CBGs before associating the CBGs with CBBs, where calculating the CBB configuration based on the CBB grouping algorithm indicator includes: associating each CB of a third plurality of CBs with one CBG of the second plurality of CBGs; and associating each CBG of the second plurality of CBGs with one subset of CBBs of the first plurality of CBBs after the association of each CB of the third plurality of CBs with one CBG of the second plurality of CBGs.

In some aspects, the techniques described herein relate to a method, further including calculating a first number of CBs associated with a first CBB of the first plurality CBBs based on a second number of CBs associated with a first CBG of the second plurality of CBGs.

In some aspects, the techniques described herein relate to a method, where associating each CB of the third plurality of CBs with one CBG of the second plurality of CBGs includes associating each CB of the third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one.

In some aspects, the techniques described herein relate to a method, where associating each CBG of the second plurality of CBGs with one subset of CBBs of the first plurality of CBBs includes associating each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one.

In some aspects, the techniques described herein relate to a method, where the CBB grouping algorithm indicator indicates the UE to associate CBs with CBBs before associating the CBBs with CBGs, where calculating the CBB configuration based on the CBB grouping algorithm indicator includes: associating each CB of a third plurality of CBs with one CBB of the first plurality of CBBs; and associating each CBB of the first plurality of CBBs with one CBG of the second plurality of CBGs after the association of each CB of the third plurality of CBs with one CBB of the first plurality of CBBs.

In some aspects, the techniques described herein relate to a method, where associating each CB of the third plurality of CBs with one CBB of the first plurality of CBBs includes associating each CB of the third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one.

In some aspects, the techniques described herein relate to a method, where associating each CBB of the first plurality of CBBs with one CBG of the second plurality of CBGs includes associating each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one.

In some aspects, the techniques described herein relate to a method, further including transmitting an indicator of a capability of the UE to associate CBBs and CBGs before the reception of the CBB grouping algorithm indicator.

In some aspects, the techniques described herein relate to a method, where the indicator indicates at least one of: a processing time for the UE to encode a number of CBs associated with one of the first plurality of CBBs; a buffer associated with an encoding of CBs associated with one of the first plurality of CBBs; a delay associated with the encoding of CBs associated with one of the first plurality of CBBs; or a maximum number of CBs that the UE is able to associate with one of the first plurality of CBBs.

In some aspects, the techniques described herein relate to a method, where transmitting the first plurality of CBBs based on the calculated CBB configuration includes, for each CBB of the first plurality of CBBs: interleaving CBs associated with the CBB; and transmitting the interleaved CBs.

In some aspects, the techniques described herein relate to a method of wireless communication at a network node, including: transmitting a CBB grouping algorithm indicator; and receiving a first plurality of CBBs based on the CBB grouping algorithm indicator, where each CBG of a second plurality of CBGs is associated with a subset of the first plurality of CBBs, where each CBB of the first plurality of CBBs is associated with exactly one of the second plurality of CBGs.

In some aspects, the techniques described herein relate to a method, where the CBB grouping algorithm indicator indicates a UE to associate CBs with CBGs before associating the CBGs with CBBs.

In some aspects, the techniques described herein relate to a method, where the CBB grouping algorithm indicator further indicates the UE to calculate a bundle size of one of the first plurality CBBs based on a number of CBs associated with one of the second plurality of CBGs.

In some aspects, the techniques described herein relate to a method, where the CBB grouping algorithm indicator further indicates the UE to associate each CB of a third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one.

In some aspects, the techniques described herein relate to a method, where the CBB grouping algorithm indicator further indicates the UE to associate each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one.

In some aspects, the techniques described herein relate to a method, where the CBB grouping algorithm indicator indicates a UE to associate CBs with CBBs before associating the CBBs with CBGs.

In some aspects, the techniques described herein relate to a method, where the CBB grouping algorithm indicator further indicates the UE to associate each CB of a third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one.

In some aspects, the techniques described herein relate to a method, where the CBB grouping algorithm indicator further indicates the UE to associate each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one.

In some aspects, the techniques described herein relate to a method, further including: receiving an indicator of a capability of a UE to associate CBBs and CBGs; and configuring the CBB grouping algorithm indicator based on the capability.

In some aspects, the techniques described herein relate to a method, where the indicator indicates at least one of: a processing time for the UE to encode a number of CBs associated with one of the first plurality of CBBs; a buffer associated with an encoding of CBs associated with one of the first plurality of CBBs; a delay associated with the encoding of CBs associated with one of the first plurality of CBBs; or a maximum number of CBs that the UE is able to associate with one of the first plurality of CBBs.

In some aspects, the techniques described herein relate to a method, where receiving the first plurality of CBBs based on the CBB grouping algorithm indicator includes, for each of the first plurality of CBBs receiving interleaved CBs of one of the first plurality of CBBs.

In some aspects, the techniques described herein relate to a method, further including deinterleaving the received first plurality of CBBs based on the CBB grouping algorithm.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
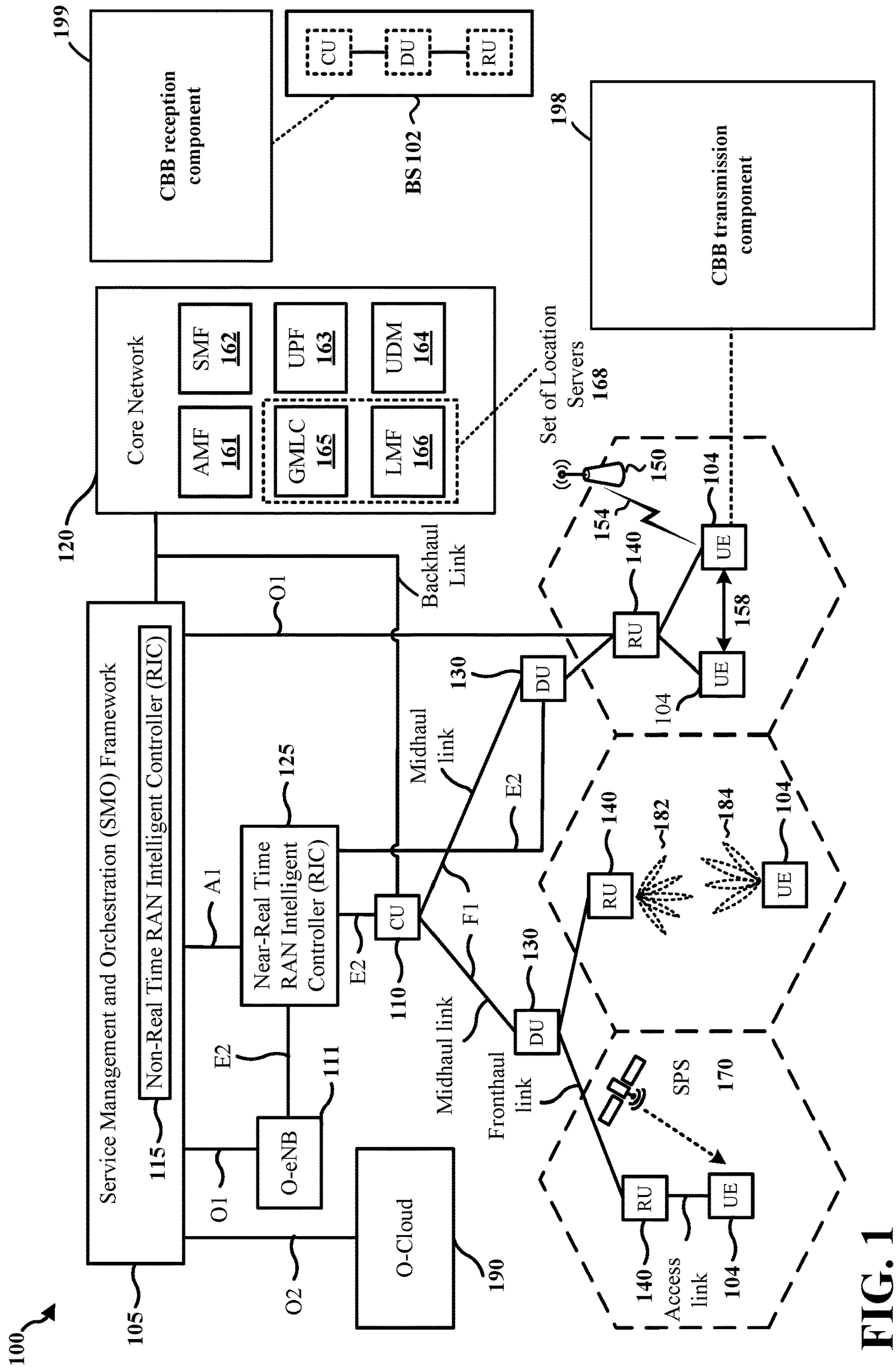
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless systems that bundle code blocks for transmission. Some aspects more specifically relate to signaling for aligning assignment of code blocks (CBs) for code block groups (CBGs) and for code block bundles (CBBs).

In some examples, a wireless device, for example a user equipment (UE), may receive a code block bundle (CBB) grouping algorithm indicator. The wireless device may calculate a CBB configuration based on the CBB grouping algorithm indicator. The wireless device may transmit a first plurality of CBBs based on the calculated CBB configuration. Each code block group (CBG) of a second plurality of CBGs may be associated with a subset of the first plurality of CBBs. Each CBB of the first plurality of CBBs may be associated with exactly one of the second plurality of CBGs. To transmit the first plurality of CBBs based on the calculated CBB configuration, the wireless device may interleave code blocks (CBs) associated with each CBB of the first plurality of CBBs. The wireless device may further transmit the interleaved CBS. The transmissions of the first plurality of CBBs may apply to both uplink (UL) transmissions and to downlink (DL) transmissions.

In some examples, a wireless device, for example a network node, may transmit a CBB grouping algorithm indicator. The wireless device may receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs.

Particular aspects of the subject matter described in this disclosure can be implemented to realize one or more of the following potential advantages. In some examples, by configuring wireless devices to improve alignment of CBGs and CBBs such that the CBBs are non-overlapping subsets of the CBGs, the described techniques can be used to reduce the average variability in decoding the CBGs. Such an alignment also enables a reduced number of negative acknowledgement transmissions being transmitted for designated CBGs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF

161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a CBB transmission component 198 that may be configured to receive a CBB grouping algorithm indicator. The CBB transmission component 198 may be configured to calculate a CBB configuration based on the CBB grouping algorithm indicator. The CBB transmission component 198 may be configured to transmit a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. In certain aspects, the base station 102 may have a CBB reception component 199 that may be configured to transmit a CBB grouping algorithm indicator. The CBB reception component 199 may be configured to receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs.

Figures 2A, 2B, 2C, 2D:
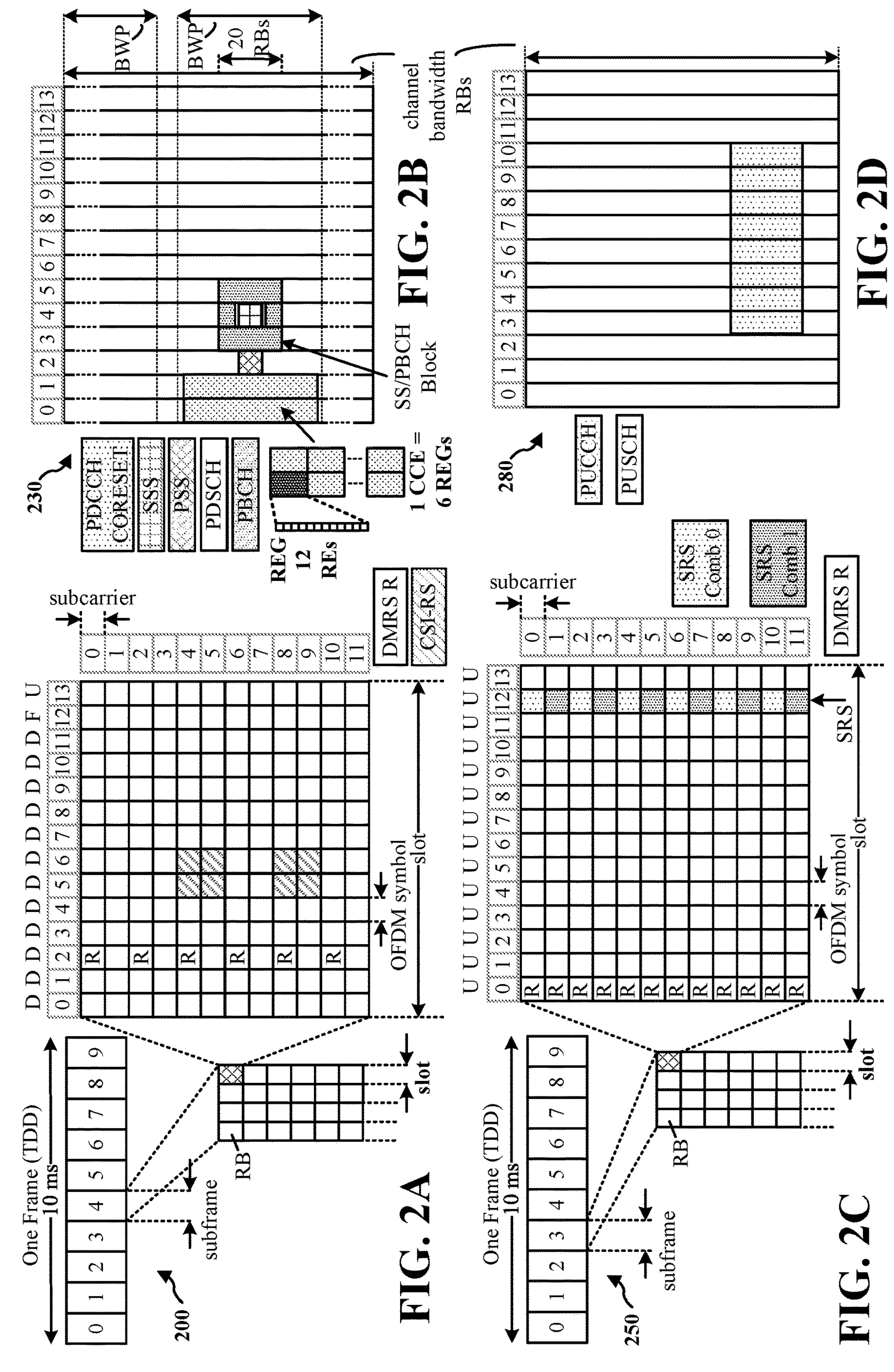
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
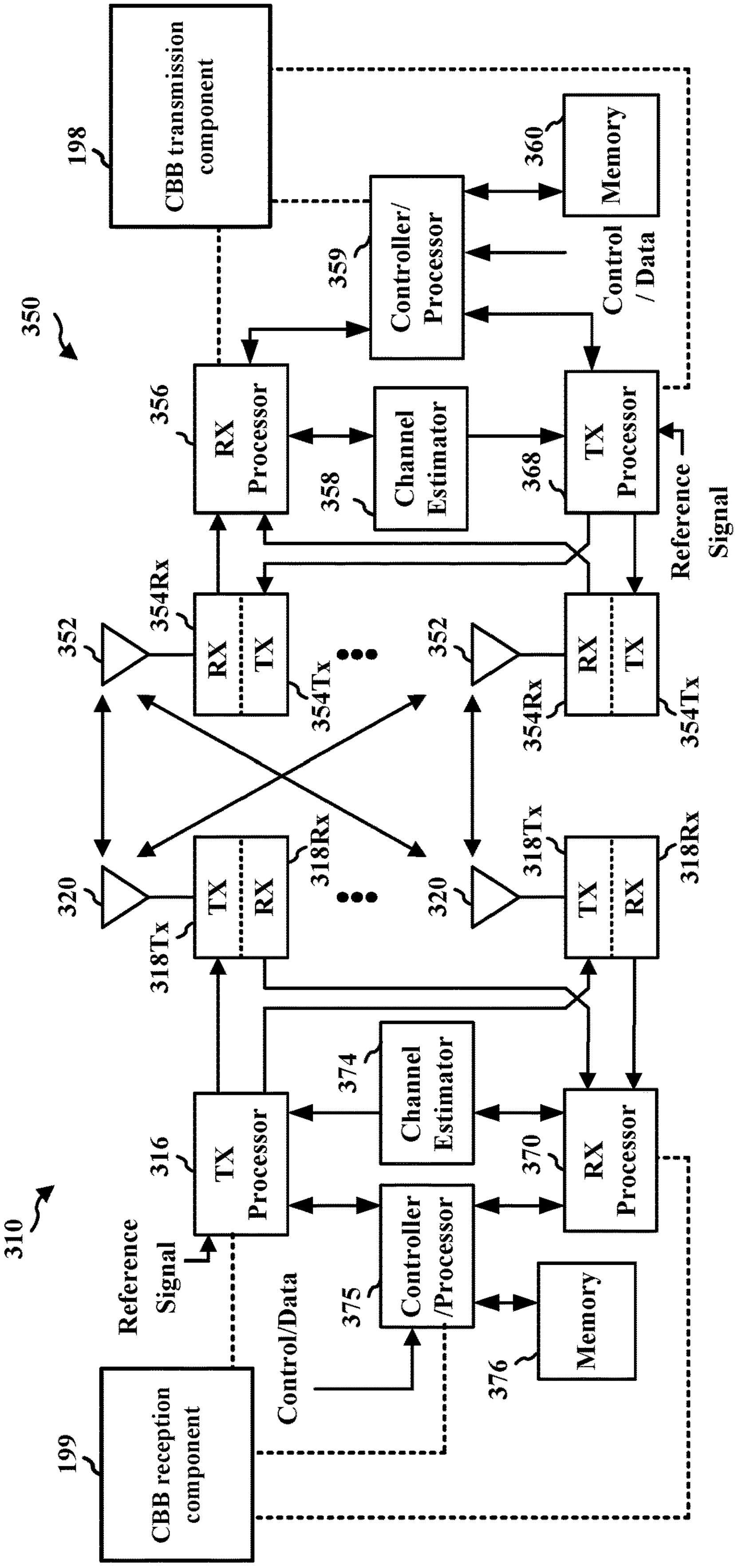
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CBB transmission component 198 of FIG. 1.

At least one of the TX processor 316, the RX processor 370, and the controller/processor 375 may be configured to perform aspects in connection with the CBB reception component 199 of FIG. 1.

Figure 4:
FIG. 4 is a diagram illustrating an example of interleaving for code block bundles (CBBs) of code blocks (CBs).

FIG. 4 is a diagram 400 illustrating an example of interleaving for CBBs of CBs. A wireless device, such as a UE, may be configured to transmit a set of CBs, such as the CB 402, the CB 404, and the CB 406. Each of the CBs may include a set of eight resource blocks (RBs), illustrated in diagram 400 as RB0-RB7. While diagram 400 shows an example of three CBs configured to be transmitted, a wireless device may be configured to transmit any number of CBs, for example two CBs, four CBs, or hundreds of CBs.

In some aspects, a UE may group a set of CBs into a CBB for transmission. The UE may interleave the CBs within a code group. For example, the CBB 408 illustrates the RBs of the CB 402, the CB 404, and the CB 406 as being interleaved for transmission of the CBB 408. In some aspects, the UE may select the interleaving granularity (i.e., units of frequency domain resources allotted to each CB in a bundle) such that, for a given delay spread and/or channel coherence bandwidth, the channels seen by the CBs in a CBB may be highly correlated. The frequency domain resources may be selected as a set of K tones in a frequency domain. A wireless device may interleave the CBs in each CBB together in a frequency domain upon rate matching. While CBB 408 illustrates three CBs interleaved in a CBB, more or less CBs may be interleaved in a CBB, for example two CBs, four CBs, sixteen CBs, or sixty-four CBs. In some aspects, a UE may interleave physical resource groups (PRGs) from other CBBs with a CBB. In other words, the UE may perform PRG-level interleaving across a plurality of CBBs.

Figure 5B:
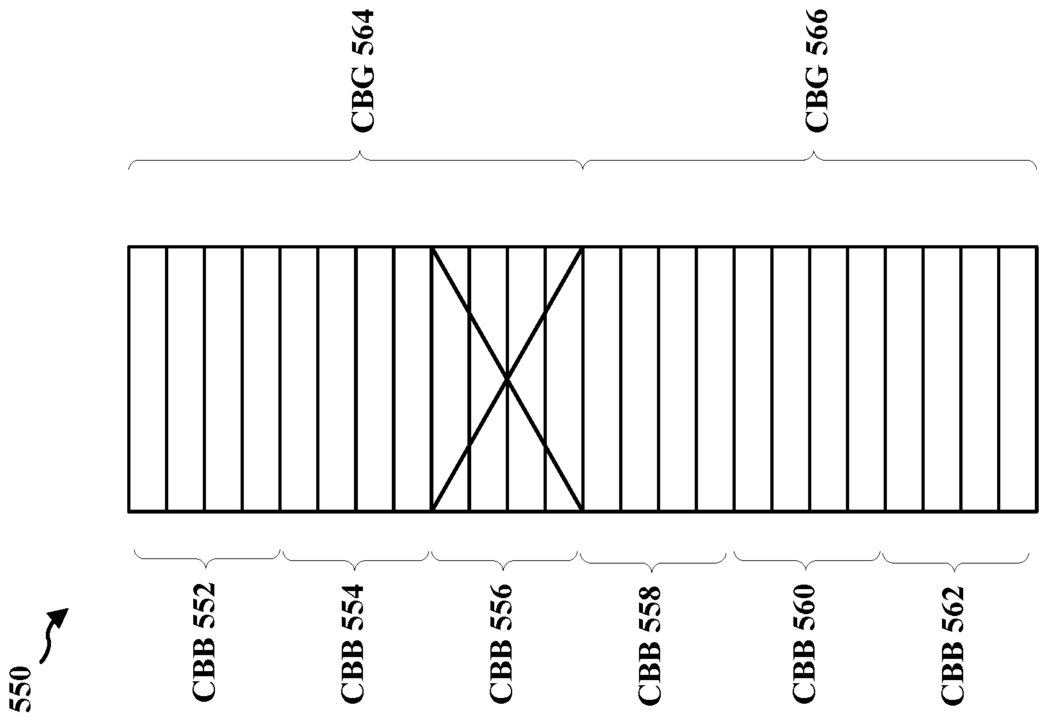
FIG. 5B is a diagram illustrating another example of grouping for CBGs of CBs and CBBs of CBs.
Figure 5A:
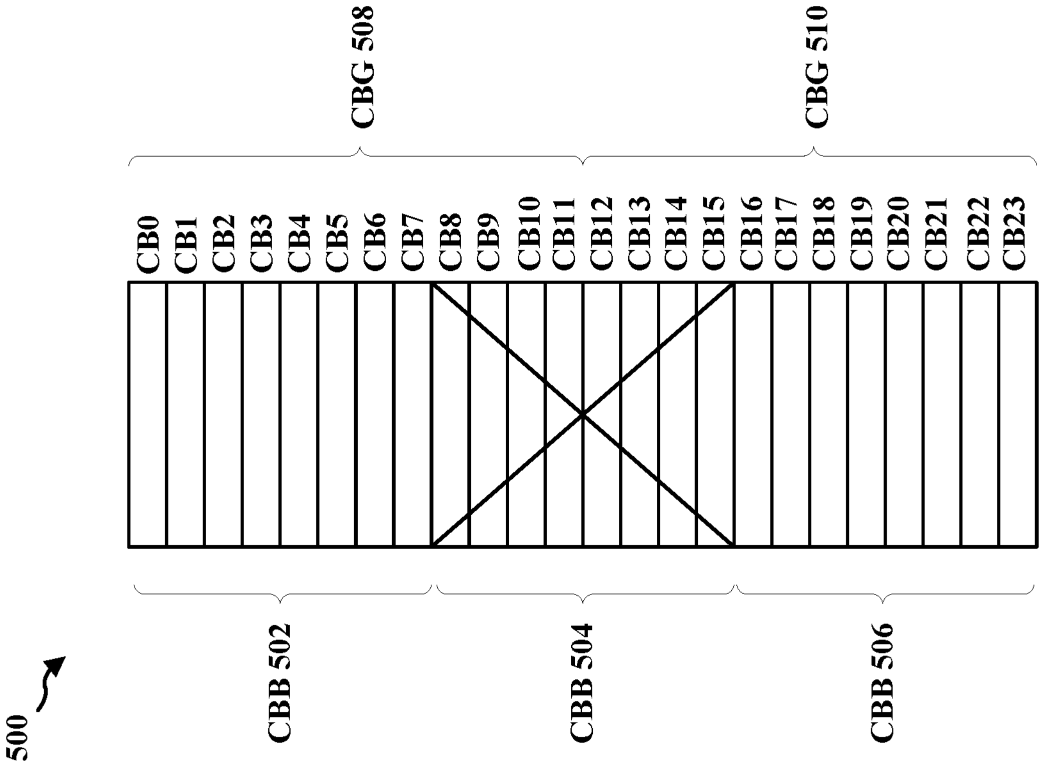
FIG. 5A is a diagram illustrating an example of grouping for code block groups (CBGs) of CBs and CBBs of CBs.

FIG. 5A is a diagram 500 illustrating an example of grouping for CBGs of CBs and CBBs of CBs. A UE may group a set of CBs, illustrated in diagram 500 as CB0-CB 23, into a plurality of CBBs, illustrated in diagram 500 as CBB 502, CBB 504, and CBB 506. Specifically, the UE may group CB0-CB7 into CBB 502, CB8-CB15 into CBB 504, and CB16-CB23 into CBB 506. Each of the CBBs may interleave CBs in the bundle for transmission. If a UE haphazardly groups CBs into CBs, a single CBB may be associated with a plurality of CBGs. As shown in diagram 500, CB0-CB11 may be associated with CBG 508, and CB12-CB23 may be associated with CBG 510.

A UE may be configured to support HARQ ACK/NACK (referred to as HARQ-ACK feedback) on a per CBG basis when adopting a CBG transmission mechanism. If a CBB crosses CBG boundaries, both CBGs may declare a NACK if the common CBB fails at decoding, thereby increasing Rx/Tx overhead. For example, if the CRC fails on one or more of the CBs in CBB 504, since all of the CBs in a CBB may experience similar channel conditions, it's likely that decoding the other CBs in CBB 504 may fail decoding. This may lead to a receiving wireless device transmitting a NACK bit in the HARQ-ACK feedback for the CBG 508 and the CBG 510, and for the CBG 508 and the CBG 510 being retransmitted.

FIG. 5B is a diagram 550 illustrating another example of grouping for CBGs of CBs and CBBs of CBs. The UE may group the CBs into six CBBs instead of the three CBBs illustrated in FIG. 5A. In other words, the UE may group CB0-CB 23 into six CBs illustrated in diagram 550 as CBB 552, CBB 554, CBB 556, CBB 558, CBB 560, and CBB 562. Each CBB is associated with exactly one CBG, as opposed to the CBB 504 in FIG. 5A which is associated with two CBGs—CBG 508 and CBG 510. Here, CBG 564 is associated with CBB 552, CBB 554, and CBB 556, and CBG 566 is associated with CBB 558, CBB 560, and CBB 562. Thus, if one CB in a CBB fails, for example on CB in CBB 556, indicating that all CBs in the CBB may fail at decoding, a receiving wireless device may transmit a NACK bit in the HARQ-ACK feedback for CBG 564 and not any other CBGs.

In summary, channels experienced by the CBs within each CBB may be highly correlated since CBs are interleaved in the frequency domain in a CBB. Since decoding of CBBs may determine overall decoding performance of the CBG, and since the number of CBBs may be less than the number of CBs, the variability of CBGs may be less.

In some aspects, a wireless device, for example a UE or a network node, may be configured to confine CBs in a CBB to be within a single CBG, preventing a CBB from overlapping with more than one CBG. In other words, the wireless device may be configured to ensure that a CBB is associated with exactly one CBG (although a CBG may not have any CBBs associated with it, as explained further below). In some aspects, if a given transport block (TB) has M CBGs and N CBs, where N>M, the wireless device may calculate M as M=min (#CBs, $\overline{M}$), where #CBs may be the total number of CBs and $\overline{M}$ may be a configured value of the maximum number of CBGs per TB. In some aspects, a network may configure the value of $\overline{M}$, for example an RRC information element (IE) may indicate a configuration (e.g., PDSCH-ServingCellConfig) that has an IE that indicates the value of M (e.g., labeled as maxCodeBlockGroupsPerTransportBlock). In some aspects, a wireless device may be configured such that M≤8 for a single codeword and M≤4 for multi-codeword transmissions. In such aspects, the ith CBG may be indicated as having $\overline{K}_l$ CBs and $Q_i$ CBBs, for each i from 0 to M−1. The total number of CBBs may be calculated as $$Q = \sum_{i=0}^{M-1} Q_i.$$

Figure 6B:
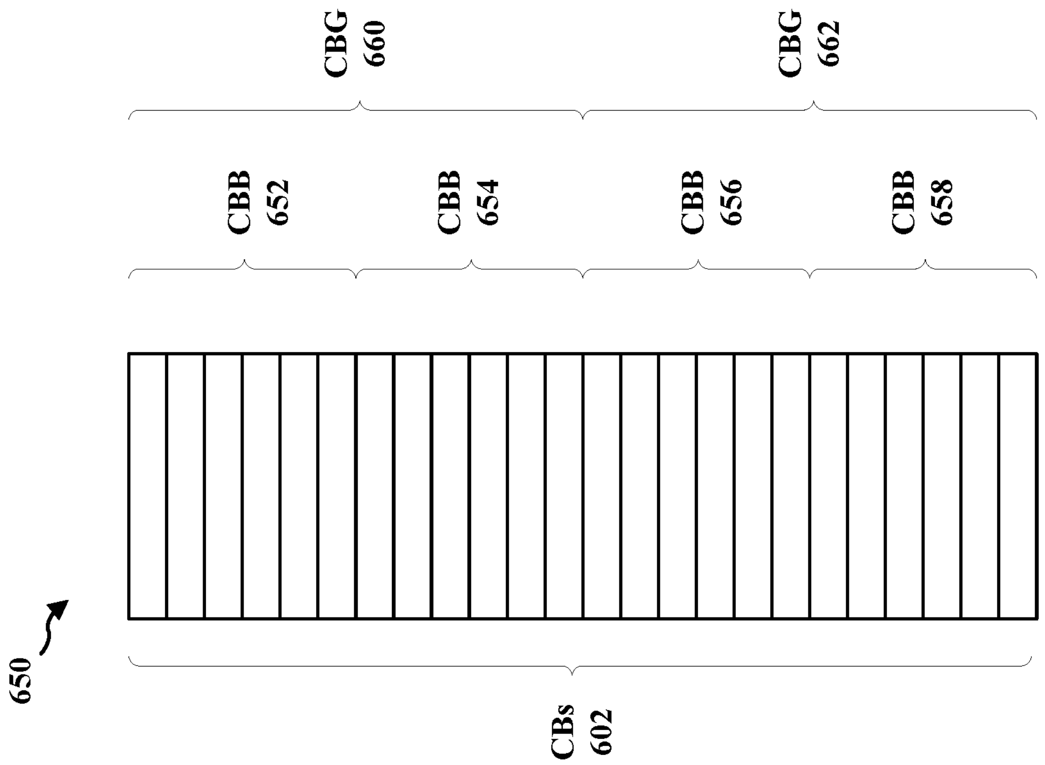
FIG. 6B is a diagram illustrating an example of grouping CBBs of CBs before grouping the CBBs with CBGs.
Figure 6A:
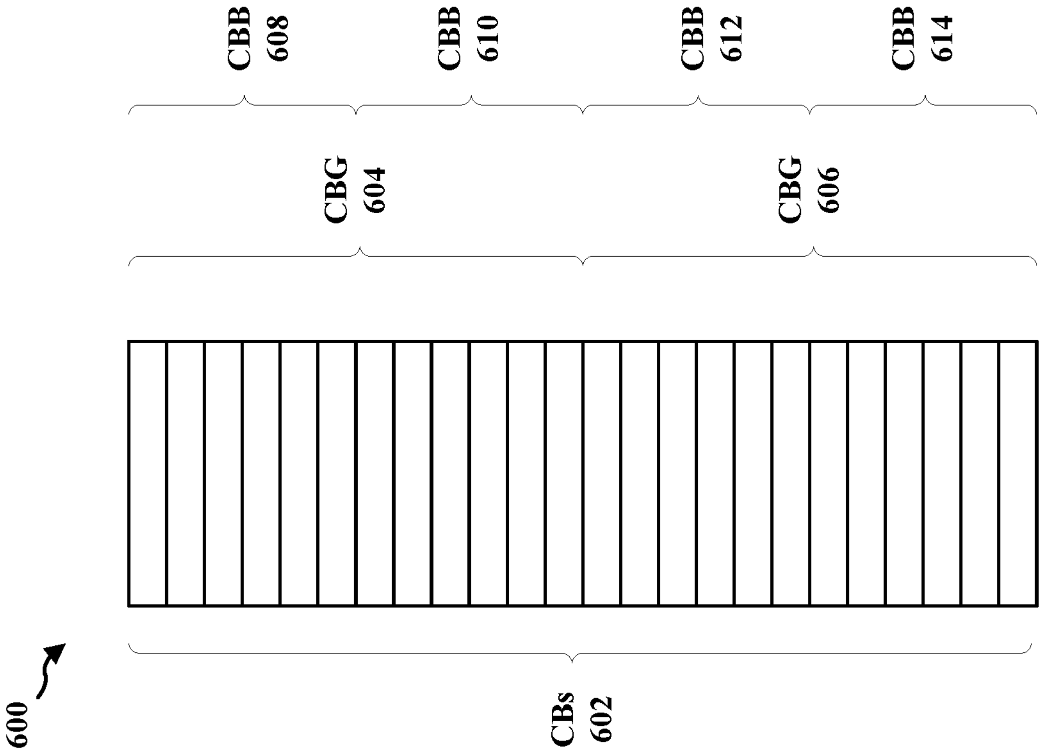
FIG. 6A is a diagram illustrating an example of grouping CBGs of CBs before grouping CBBs within each CBG.

FIG. 6A is a diagram 600 illustrating an example of grouping CBGs of CBs before splitting CBGs into CBBs. A wireless device may be configured to transmit a set of CBs 602. The set of CBs 602 are shown in diagram 600 as CB0-CB23 (similar to the CBs of FIG. 5A). A wireless device may first split the set of CBs 602 into CBGs, and then may split the CBGs into sets of CBBs. Here, the wireless device may split the set of CBs 602 into two sets of CBGs—the CBG 604 and the CBG 606. The wireless device may then split each CBG into two sets of CBBs. Here, the wireless device may split CBG 604 into CBB 608 and CBB 610, and may split CBG 606 into CBB 612 and CBB 614.

In other words, the wireless device may first group CBs into CBGs (i.e., group the set of CBs 602 into the CBG 604 and the CBG 606), then split each CBG further into CBBs (i.e., split the CBG 604 into the CBB 608 and the CBB 610, split the CBG 606 into the CBB 612 and the CBB 614). Instead of computing bundle sizes, or number of CBs associated with a CBB, the wireless device may compute the size of a CBB based on the number of CBs that form the parent CBG.

In some aspects, the wireless device may group the CBs into CBGs such that the CBG sizes differ by no more than one CB. In other words, the CBG size $\overline{K}_l$ may be K or K−1 CBs, where K=ceil (N/M). This may avoid unbalanced CBG sizes and reduce the variability in HARQ-ACK feedback (i.e., ACK/NACKs) across CBGs. Within each CBG, the wireless device may group the CBBs such that the size of each CBB varies by no more than one CB. The wireless device may also ensure that the max CBB size, which may be indicated in a capability message, is not exceeded. The wireless device may calculate each $Q_i$ as $Q_i = \lceil \overline{K}_l / \overline{N} \rceil$, where $\overline{N}$ is the CBB size (i.e., number of CBs). The wireless device may form the first mod ($\overline{K}_l$, $Q_i$) CBBs with $\overline{N}$ CBs each, where the remaining ($Q_i$−mod ($\overline{K}_l$, $Q_i$)) CBBs have with $\overline{N}$−1 CBs each.

FIG. 6B is a diagram 650 illustrating an example of grouping CBBs of CBs before grouping the CBBs with CBGs. A wireless device may be configured to transmit a set of CBs 602. The set of CBs 602 are shown in diagram 650 as CB0-CB23 (similar to the CBs of FIG. 5A). A wireless device may first split the set of CBs 602 into CBBs, and then may group the CBBs into CBGs. Here, the wireless device may split the set of CBs 602 into four sets of CBBs—the CBB 652, the CBB 654, the CBB 656, and the CBB 658. The wireless device may then group the CBBs into two sets of CBGs. Here, the wireless device may group CBB 652 and CBB 654 into CBG 660, and may group CBB 656 and CBB 658 into CBG 662.

In other words, the wireless device may first group CBs into CBBs (i.e., group the set of CBs 602 into the CBB 652, the CBB 654, the CBB 656, and the CBB 658), then assign each CBB to one CBG max (i.e., assign the CBB 652 and the CBB 654 to CBG 660, assign the CBB 656 and the CBB 658 to the CBG 662).

In some aspects, the wireless device may group the CBs into CBBs into a total of Q CBBs. The wireless device may configure the grouping such that the max CBB is not exceeded (e.g., a UE capability may indicate a largest CBB that can be handled for UL/DL). The wireless device may configure the grouping such that the CBBs do not differ in size by more than one CB. The wireless device may then group the Q CBBs into M CBGs such that the size of the CBGs (the number of CBBs per CBG) does not differ by more than 1 CBB. This may avoid unbalanced CBG sizes and reduce the variability in HARQ-ACK feedback (i.e., ACK/NACKs) across CBGs. For example, the wireless device may group the first $\mathrm{mod}(Q, M)\times\lceil Q/M\rceil$ CBBs into mod(Q, M) CBGs of size $\lceil Q/M\rceil$ bundles each. The wireless device may then group the rest of the CBBs into M−mod(Q, M) CBGs of size $\lfloor Q/M\rfloor$ bundles each. In other words, $Q_i=\lceil Q/M\rceil$ for i=0 to mod(Q, M)−1, and $\lfloor Q/M\rfloor$ for i=mod (Q, M) to M−1.

In some aspects, a wireless device that groups CBGs of CBs before splitting CBGs into CBBs may create the same, or similar, groups of CBGs and CBBs as a wireless device that groups CBBs of CBs before grouping the CBBs with CBGs. However, in some aspects, the groups may be different.

For example, a wireless device may select the number of CBBs Q as $Q=\lceil(\#\text{CBs}/\text{max CBB size})\rceil$, where the maximum CBB size may be calculated a function of the capability of a wireless device (e.g., UE capability), such as buffer and delay constraints. In some aspects, Q may be less than, or greater than, M. For example, where $Q\leq M$ (e.g., when the number of CBs is small, or the size of the TB is small), the wireless device may group the Q CBBs into Q CBGs with a one-to-one mapping, and leave the rest of the (M−Q) CBGs empty.

Figure 7B:
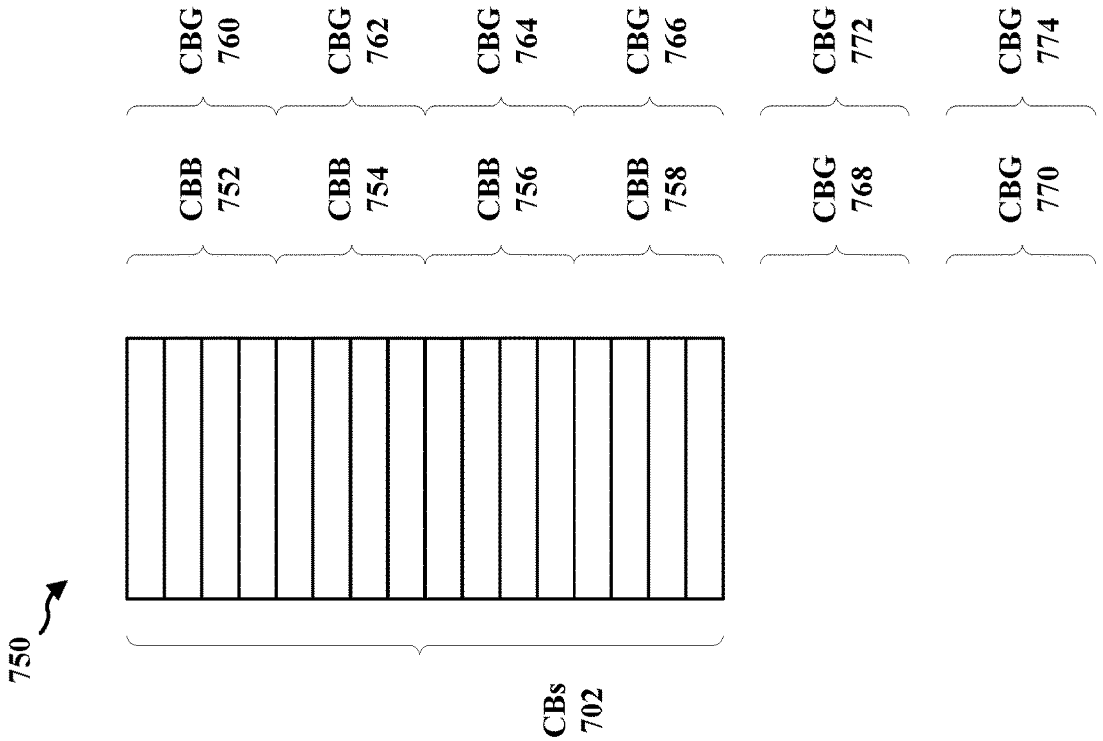
FIG. 7B is a diagram illustrating an example of grouping CBBs of CBs before grouping the CBBs with CBGs.
Figure 7A:
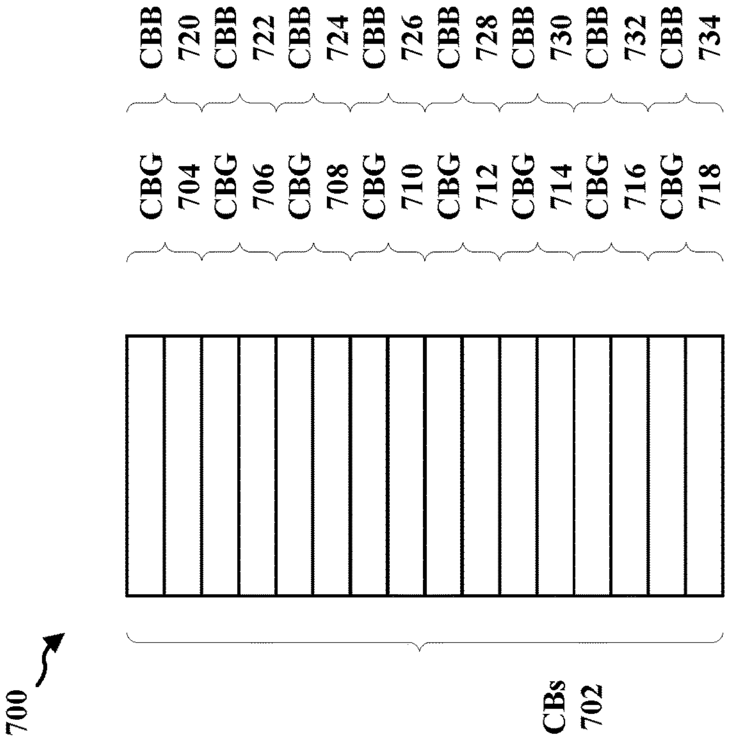
FIG. 7A is a diagram illustrating an example of grouping CBGs of CBs before grouping CBBs within each CBG.

FIG. 7A is a diagram 700 illustrating an example of grouping CBGs of CBs before grouping CBBs within each CBG. The wireless device may be configured to transmit a set of CBs 702. The set of CBs 702 are shown in diagram 700 as CB0-CB15. A wireless device may first split the set of CBs 702 into CBGs, and then may split the CBGs into sets of CBBs. Here, the wireless device may split the set of CBs 702 into eight sets of CBGs—CBG 704, CBG 706, CBG 708, CBG 710, CBG 712, CBG 714, CBG 716, and CBG 718. The wireless device may then split each CBG into sets of CBBs. Here, the wireless device may assign one CBB to each CBG. In other words, the wireless device may assign all of the CBs of CBG 704 to CBB 720, all of the CBs of CBG 706 to CBB 722, all of the CBs of CBG 708 to CBB 724, all of the CBs of CBG 710 to CBB 726, all of the CBs of CBG 712 to CBB 728, all of the CBs of CBG 714 to CBB 730, all of the CBs of CBG 716 to CBB 732, and all of the CBs of CBG 718 to CBB 734.

FIG. 7B is a diagram 750 illustrating an example of grouping CBBs of CBs before grouping the CBBs with CBGs. A wireless device may be configured to transmit a set of CBs 702. The set of CBs 702 are shown in diagram 750 as CB0-CB15. A wireless device may first split the set of CBs 702 into CBBs, and then may group the CBBs into CBGs. Here, the wireless device may split the set of CBs 702 into four sets of CBBs—the CBB 752, the CBB 754, the CBB 756, and the CBB 758—as the max CB bundle size may support 4 CBs for each CBB. The wireless device may then group the CBBs into four sets of CBGs. Here, the wireless device may group CBB 752 into CBG 760, may group CBB 754 into CBG 762, may group CBB 756 into CBG 764, and may group CBB 758 into CBG 766. However, the wireless device may have eight CBGs. This means that CBG 768, CBG 770, CBG 772, and CBG 774 may be empty CBGs without any CBBs assigned to the CBG. Such a configuration may waste configured CBGs.

In some aspects, a first wireless device, such as a network node, may be configured to configure a CBB grouping algorithm at a second wireless device, such as the UE, based on the capability of the second wireless device. For example, a UE may report its capability as a max supported CBB size being 4 CBs per CBB. Where N=16 and $\overline{M}$=8, then if the wireless device first groups CBs into CBGs and then splits CBGs into CBBs, then $M=\min(\overline{M},N)=8$, $\overline{K}_i=2$, $Q_i=1$, for i=0 to 7, where i is the CBG index. However, if the wireless device first groups CBs into CBBs and then assigns CBBs to CBGs, then $M=\min(\overline{M},N)=8$, $Q=\lceil N/4\lceil=4$, $Q_i=1$, $\overline{K}_i=4$, for i=0 to 3 and $Q_i=0$, $\overline{K}_i=0$, for i=4 to 7.

As explained above, N may denote the number of CBs, $\overline{M}$ may denote the configured number of CBGs per TB, M may denote the number of CBGs per TB (e.g., where $M=\min(N, \overline{M})$), $\overline{K}_i$ is the number of CBs contained in the ith CBG from i=0 to M, and $Q_i$ is the number of CBBs contained in the ith CBG from i=0 to M.

In some aspects, a first wireless device, for example a UE, may report its capability to support either associate CBs with CBGs before associating CBGs with CBBs, or associate CBs with CBBs before associating CBBs with CBGs. A second wireless device, for example a network node, may receive the capability, and may then determine which CBB grouping algorithm to use. The second wireless device may signal that information to the first wireless device, so that the first wireless device may calculate the boundaries of each CBG and CBB for processing (e.g., UL or DL). A network node may indicate the CBB grouping algorithm through a bit of a system transmission (e.g., RRC, DCI, MAC-CE).

Figure 8:
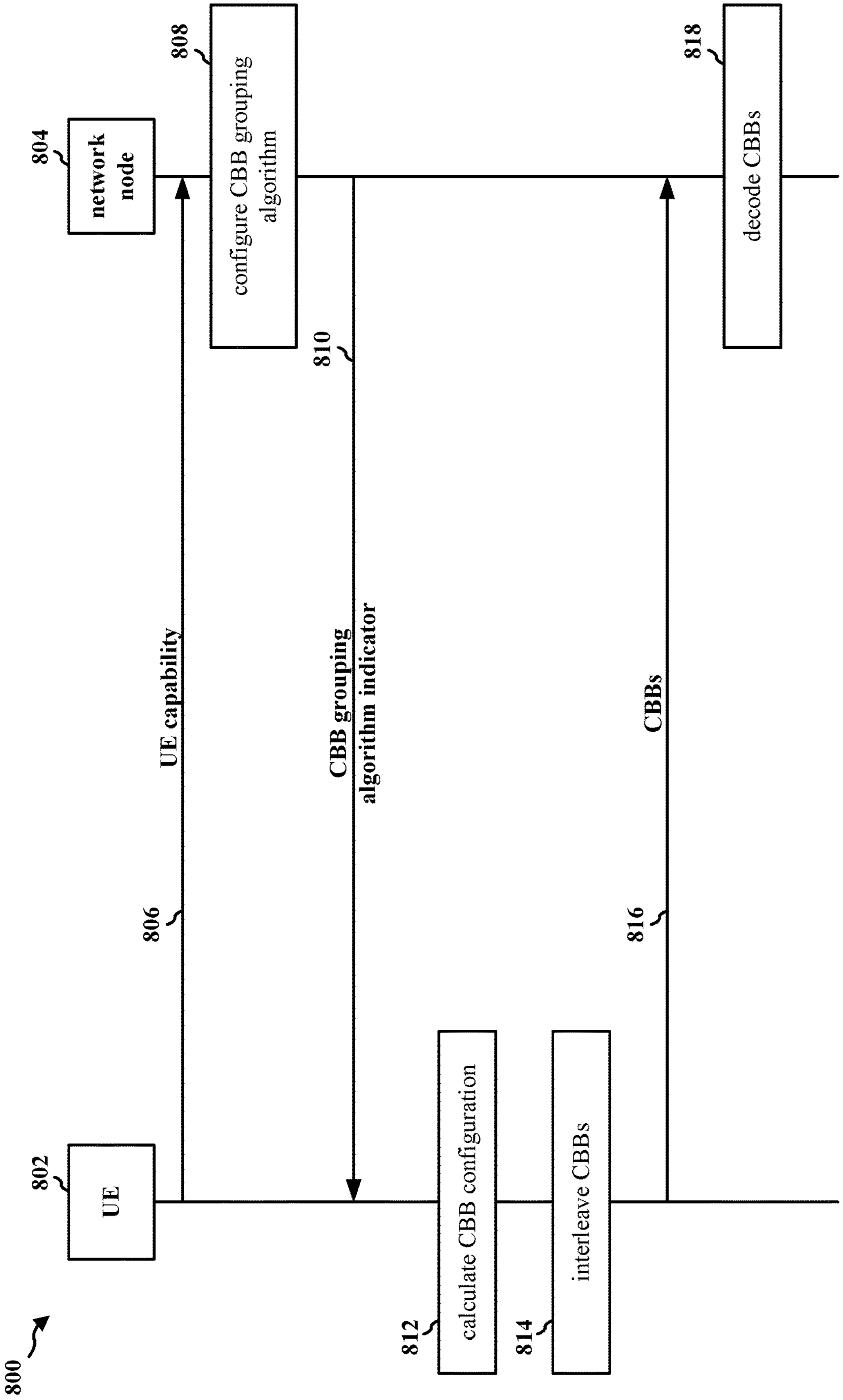
FIG. 8 is a connection flow diagram illustrating an example of signaling between a UE and a network node configured to align grouping of CBs in CBGs and CBBs.

FIG. 8 is a connection flow diagram 800 illustrating an example of signaling between a UE 802 and a network node 804 configured to align grouping of CBs in CBGs and CBBs.

The UE 802 may transmit a UE capability 806 to the network node 804. The network node 804 may receive the UE capability 806 from the UE 802. The UE capability 806 may indicate a capability of the UE 802 to align groups of CBBs and CBGs for transmission of CBBs at the UE 802. In some aspects, the UE capability 806 may indicate at least one of (a) a processing time for the UE 802 to encode a number of CBs associated with a CBB, (b) a buffer used by the UE 802 to encode CBs of a CBB, (c) a delay of the UE 802 to decode CBs of a CBB, or (d) a maximum number of CBs that the UE 802 can group into a CBB.

At 808, the network node 804 may configure a CBB grouping algorithm for the UE 802. The network node 804 may determine whether to indicate to the UE 802 to associate CBBs and CBGs to CBs based on the UE capability 806. For example, at 808, the network node 804 may configure the UE 802 to associate CBBs and CBGs to CBs if the UE capability 806 indicates that the UE 802 is capable of doing so, or may configure the UE 802 to not associate CBBs and CBGs to CBs if the UE capability 806 indicates that the UE 802 is not capable of doing so. The network node 804 may select whether the UE 802 groups/associates CBs with CBGs before splitting the CBGs into CBBs, or groups/associates CBs with CBBs before assigning CBBs to CBGs based on the UE capability 806. For example, at 808, the network node 804 may configure the UE 802 to group/associate CBs with CBGs before splitting the CBGs into CBBs if the UE capability 806 indicates that the UE 802 has a buffer or processing time less than or equal to a threshold value, or may configure the UE 802 to group/associate CBs with CBBs before assigning CBBs to CBGs if the UE capability 806 indicates that the UE 802 has a buffer or processing time greater than or equal to a threshold value.

The network node 804 may transmit a CBB grouping algorithm indicator 810 to the UE 802. The UE 802 may receive the CBB grouping algorithm indicator 810 from the network node 804. The CBB grouping algorithm indicator 810 may indicate to the UE 802 the configuration configured at 808 (e.g., whether the UE 802 bundles CBs into CBBs, whether the UE 802 first groups CBs into CBBs and second assigns CBBs to CBGs, whether the UE 802 first groups CBs into CBGs and splits CBGs into CBBs).

At 812, the UE 802 may calculate a CBB configuration based on the CBB grouping algorithm indicator 810. For example, based on the CBB grouping algorithm indicator 810, the UE 802 may first split a set of CBs into CBGs, and then split each of the CBGs into a set of CBBs, or may indicate for the UE 802 to first split a set of CBs into CBBs, and then assign sets of CBBs to at least some of a plurality of CBGs.

At 814, the UE 802 may interleave CBBs for transmission to the network node 804. The UE 802 may transmit the set of CBBs 816 at the network node 804. The network node 804 may receive the set of CBBs 816 from the UE 802. At 818, the network node 804 may decode the set of CBBs, for example by deinterleaving the CBBs. Since the UE 802 ensures that each CBB is associated with at most one CBG, if the network node 804 fails to decode a CBB, the network node 804 may transmit a request for the UE 802 to retransmit at most one CBG for each CBB that fails to decode.

Figure 9:
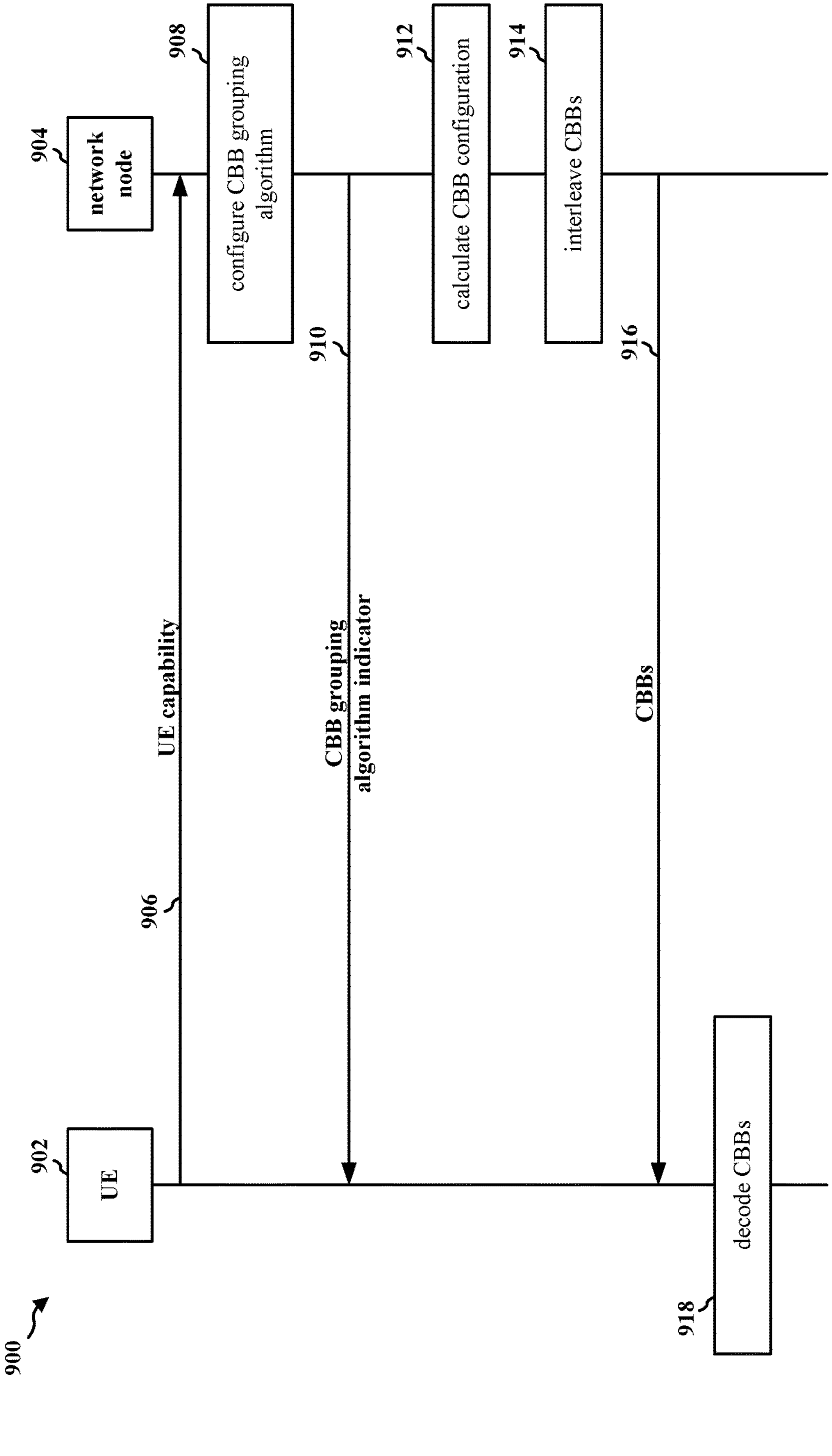
FIG. 9 is a connection flow diagram illustrating an example of signaling between a UE and a network node configured to align grouping of CBs in CBGs and CBBs.

FIG. 9 is a connection flow diagram 900 illustrating an example of signaling between a UE 902 and a network node 904 configured to align grouping of CBs in CBGs and CBBs.

The UE 902 may transmit a UE capability 906 to the network node 904. The network node 904 may receive the UE capability 906 from the UE 902. The UE capability 906 may indicate a capability of the UE 902 to decode groups of CBBs for transmission of CBBs at the network node 904. In some aspects, the UE capability 906 may indicate at least one of (a) a processing time for the UE 902 to decode a number of CBs associated with a CBB, (b) a buffer used by the UE 902 to decode CBs of a CBB, (c) a delay of the UE 902 to decode CBs of a CBB, or (d) a maximum number of CBs that the UE 902 can handle decoding/deinterleaving for a received CBB.

At 908, the network node 904 may configure a CBB grouping algorithm for the UE 902. The network node 904 may determine whether to indicate to the UE 902 that it will be transmitting CBs as CBBs based on the UE capability 906. For example, at 908, the network node 904 may configure the UE 902 to receive CBBs having interleaved CBs if the UE capability 906 indicates that the UE 902 is capable of doing so, or may configure the UE 902 to not receive CBBs having interleaved CBs if the UE capability 906 indicates that the UE 902 is not capable of doing so. The network node 904 may select whether the network node 904 will group/associate CBs with CBGs before splitting the CBGs into CBBs, or will group/associate CBs with CBBs before assigning CBBs to CBGs based on the UE capability 906. For example, at 908, the network node 904 may configure the network node 904 to group/associate CBs with CBGs before splitting the CBGs into CBBs if the UE capability 906 indicates that the UE 902 has a buffer or processing time less than or equal to a threshold value, or may configure the network node 904 to group/associate CBs with CBBs before assigning CBBs to CBGs if the UE capability 906 indicates that the UE 902 has a buffer or processing time greater than or equal to a threshold value.

The network node 904 may transmit a CBB grouping algorithm indicator 910 to the UE 902. The UE 902 may receive the CBB grouping algorithm indicator 910 from the network node 904. The CBB grouping algorithm indicator 910 may indicate to the UE 902 the configuration configured at 908 (e.g., whether the network node 904 bundles CBs into CBBs, whether the network node 904 first groups CBs into CBBs and second assigns CBBs to CBGs, whether the network node 904 first groups CBs into CBGs and splits CBGs into CBBs).

At 912, the network node 904 may calculate a CBB configuration configured at 908. The configuration may be indicated to the UE 902 by the CBB grouping algorithm indicator 910. For example, the network node 904 may first split a set of CBs into CBGs, and then split each of the CBGs into a set of CBBs, or may first split a set of CBs into CBBs, and then assign sets of CBBs to at least some of a plurality of CBGs. The UE 902 may understand how the network node 904 assigns the CBBs and CBGs based on the CBB grouping algorithm indicator.

At 914, the network node 904 may interleave the set of CBBs 916 for transmission to the UE 902. The network node 904 may transmit the set of CBBs 916 at the UE 902. The UE 902 may receive the set of CBBs 916 from the network node 904. At 918, the UE 902 may decode the set of CBBs 916, for example by deinterleaving the CBBs. Since the network node 904 ensures that each CBB is associated with at most one CBG, if the UE 902 fails to decode a CBB, the UE 902 may transmit a request for the network node 904 to retransmit at most one CBG for each CBB that fails to decode.

Figure 10:
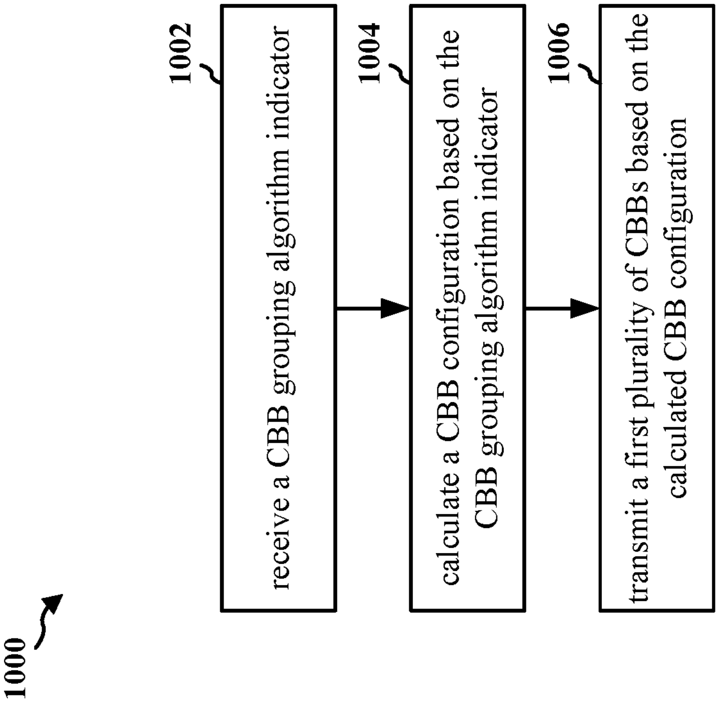
FIG. 10 is a flowchart of a method of wireless communication.

FIG. 10 is a flowchart 1000 of a method of wireless communication. The method may be performed by a UE (e.g., the UE 104, the UE 350, the UE 802; the apparatus 1504). At 1002, the UE may receive a CBB grouping algorithm indicator. For example, 1002 may be performed by the UE 802 in FIG. 8, which may receive the CBB grouping algorithm indicator 810 from the network node 804. Moreover, 1002 may be performed by the component 198 in FIG. 1, 3, or 15.

At 1004, the UE may calculate a CBB configuration based on the CBB grouping algorithm indicator. For example, 1004 may be performed by the UE 802 in FIG. 8, which may, at 812, calculate a CBB configuration for the set of CBBs 816 based on the CBB grouping algorithm indicator 810. Moreover, 1004 may be performed by the component 198 in FIG. 1, 3, or 15.

At 1006, the UE may transmit a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. For example, 1006 may be performed by the UE 802 in FIG. 8, which may transmit the set of CBBs 816 based on the CBB configuration calculated at 812. Each CBG of a plurality of CBGs may be associated with a subset of the set of CBBs 816, for example the CBG 604 of the group of CBGs that include the CBG 604 and the CBG 606 in FIG. 6A may be associated with the CBB 608 and the CBB 610 of the group of CBBs that include the CBB 608, the CBB 610, the CBB 612, and the CBB 614. Each CBB of the set of CBBs 816 may be associated with exactly one of the plurality of CBGs, for example as the CBB 608 is associated with CBG 604 and not CBG 606, and the CBB 610 is associated with CBG 604 and not CBG 606. Moreover, 1006 may be performed by the component 198 in FIG. 1, 3, or 15.

Figure 11:
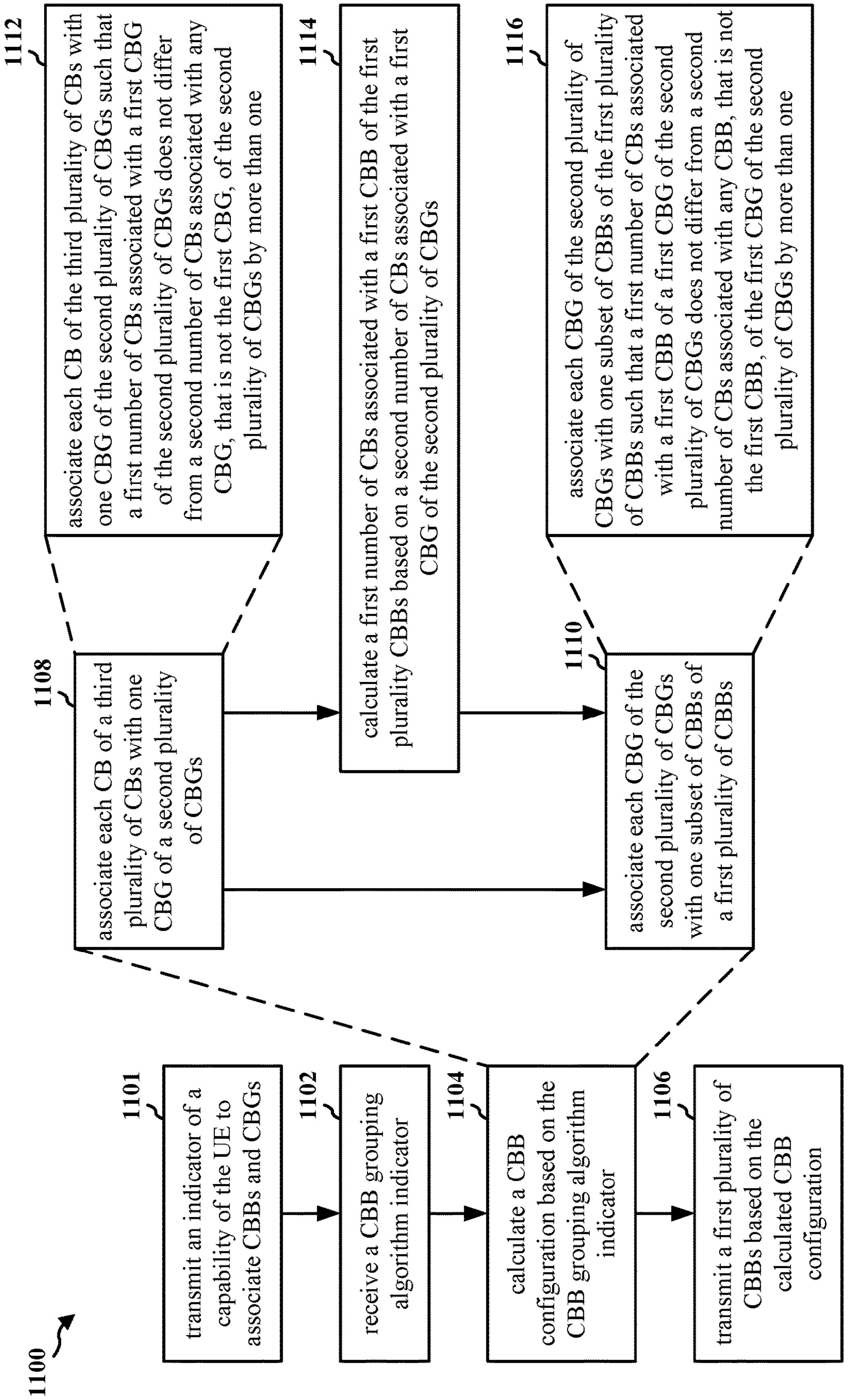
FIG. 11 is a flowchart of a method of wireless communication.

FIG. 11 is a flowchart 1100 of a method of wireless communication. The method may be performed by a UE (e.g., the UE 104, the UE 350, the UE 802; the apparatus 1504).

At 1101, the UE may transmit an indicator of a capability of the UE to associate CBBs and CBGs. The indicator may indicate a processing time for the UE to encode a number of CBs associated with one of the first plurality of CBBs. The indicator may indicate a buffer associated with an encoding of CBs associated with one of the first plurality of CBBs. The indicator may indicate a delay associated with the encoding of CBs associated with one of the first plurality of CBBs. The indicator may indicate a maximum number of CBs that the UE is able to associate with one of the first plurality of CBBs. For example, 1101 may be performed by the UE 802 in FIG. 8, which may transmit the UE capability 806 to the network node 804. The UE capability 806 may include an indicator of a capability of the UE 802 to associate CBBs and CBGs. The indicator may indicate an estimated maximum processing time for the UE 802 to use to encode CBs of a CBB. The indicator may indicate a buffer size that the UE 802 uses to encode CBs of a CBB. The indicator may indicate an estimated maximum delay for the UE 802 to encode CBs of a CBB. The indicator may indicate a maximum number of CBs that the UE 802 is able to associate with a single CBB (e.g., a maximum number of CBs that can be interleaved for transmission of an interleaved CBB). Moreover, 1101 may be performed by the component 198 in FIG. 1, 3, or 15.

At 1102, the UE may receive a CBB grouping algorithm indicator. For example, 1102 may be performed by the UE 802 in FIG. 8, which may receive the CBB grouping algorithm indicator 810 from the network node 804. Moreover, 1102 may be performed by the component 198 in FIG. 1, 3, or 15.

At 1104, the UE may calculate a CBB configuration based on the CBB grouping algorithm indicator. For example, 1104 may be performed by the UE 802 in FIG. 8, which may, at 812, calculate a CBB configuration for the set of CBBs 816 based on the CBB grouping algorithm indicator 810. Moreover, 1104 may be performed by the component 198 in FIG. 1, 3, or 15.

At 1106, the UE may transmit a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. For example, 1106 may be performed by the UE 802 in FIG. 8, which may transmit the set of CBBs 816 based on the CBB configuration calculated at 812. Each CBG of a plurality of CBGs may be associated with a subset of the set of CBBs 816, for example the CBG 604 of the group of CBGs that include the CBG 604 and the CBG 606 in FIG. 6A may be associated with the CBB 608 and the CBB 610 of the group of CBBs that include the CBB 608, the CBB 610, the CBB 612, and the CBB 614. Each CBB of the set of CBBs 816 may be associated with exactly one of the plurality of CBGs, for example as the CBB 608 is associated with CBG 604 and not CBG 606, and the CBB 610 is associated with CBG 604 and not CBG 606. Moreover, 1106 may be performed by the component 198 in FIG. 1, 3, or 15.

At 1108, the UE may calculate the CBB configuration based on the CBB grouping algorithm indicator by associating each CB of a third plurality of CBs with one CBG of a second plurality of CBGs. The CBB grouping algorithm indicator may indicate the UE to associate CBs with CBGs before associating the CBGs with CBBs. For example, 1108 may be performed by the UE 802 in FIG. 8, which may, at 812, associate each CB of the CBs to transmit to the network node 804 with one CBG of a plurality of CBGs. The CBB grouping algorithm indicator 810 may indicate for UE 802 to associate CBs with CBGs before associating the CBGs with CBBs. For example, the UE 802 may associate a subset of the set of CBs 602 in FIG. 6A with the CBG 604 before splitting the CBG 604 into the CBB 608 and the CBB 610. Moreover, 1108 may be performed by the component 198 in FIG. 1, 3, or 15.

At 1110, the UE may calculate the CBB configuration based on the CBB grouping algorithm indicator by associating each CBG of the second plurality of CBGs with one subset of CBBs of a first plurality of CBBs. The CBB grouping algorithm indicator may indicate the UE to associate CBs with CBGs before associating the CBGs with CBBs. For example, 1110 may be performed by the UE 802 in FIG. 8, which may associate each CBG of a set of CBGs to transmit to the network node 804 (each of which comprise CBs) with one subset of CBBs of the set of CBBs 816 to transmit to the network node 804. The CBB grouping algorithm indicator 810 may indicate for the UE 802 to associate CBs with CBGs before associating the CBGs with CBBs. For example, the UE 802 may associate a subset of the set of CBs 602 in FIG. 6A with the CBG 604 before splitting the CBG 604 into the CBB 608 and the CBB 610. Moreover, 1110 may be performed by the component 198 in FIG. 1, 3, or 15.

At 1112, the UE may associate each CB of the third plurality of CBs with one CBG of a second plurality of CBGs by associating each CB of the third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one. For example, 1112 may be performed by the UE 802 in FIG. 8, which may split the set of CBs to transmit to the network node 804 evenly into CBGs such that the size of each CBG differs by at most one CB from any other CBG of the set of CBGs to transmit to the network node 804. Moreover, 1112 may be performed by the component 198 in FIG. 1, 3, or 15.

At 1114, the UE may calculate a first number of CBs associated with a first CBB of the first plurality CBBs based on a second number of CBs associated with a first CBG of the second plurality of CBGs. For example, 1114 may be performed by the UE 802 in FIG. 8, which may split the CBBs evenly among a CBG such that the size of each CBB differs by at most one CB from any other CBB of the CBBs associated with the CBG. Moreover, 1114 may be performed by the component 198 in FIG. 1, 3, or 15.

At 1116, the UE may associate each CBG of the second plurality of CBGs with one subset of CBBs of the first plurality of CBBs by associating each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one. For example, 1116 may be performed by the UE 802 in FIG. 8, which may split the CBBs evenly among each CBG such that the size of each CBB differs by at most one CB from any other CBB of the CBBs associated with the corresponding CBG. Moreover, 1116 may be performed by the component 198 in FIG. 1, 3, or 15.

Figure 12:
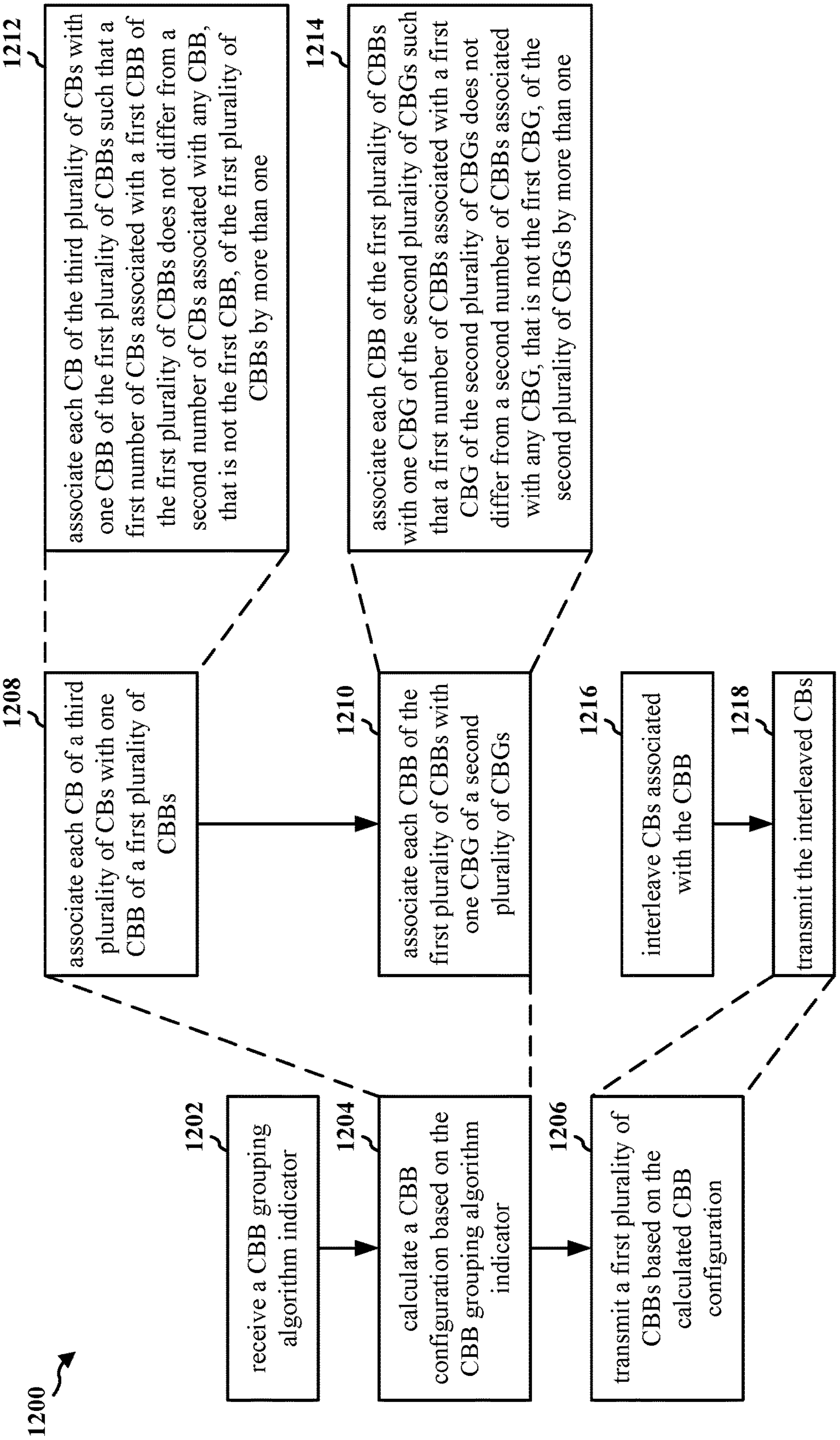
FIG. 12 is a flowchart of a method of wireless communication.

FIG. 12 is a flowchart 1200 of a method of wireless communication. The method may be performed by a UE (e.g., the UE 104, the UE 350, the UE 802; the apparatus 1504). At 1202, the UE may receive a CBB grouping algorithm indicator. For example, 1202 may be performed by the UE 802 in FIG. 8, which may receive the CBB grouping algorithm indicator 810 from the network node 804. Moreover, 1202 may be performed by the component 198 in FIG. 1, 3, or 15.

At 1204, the UE may calculate a CBB configuration based on the CBB grouping algorithm indicator. For example, 1204 may be performed by the UE 802 in FIG. 8, which may, at 812, calculate a CBB configuration for the set of CBBs 816 based on the CBB grouping algorithm indicator 810. Moreover, 1204 may be performed by the component 198 in FIG. 1, 3, or 15.

At 1206, the UE may transmit a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. For example, 1206 may be performed by the UE 802 in FIG. 8, which may transmit the set of CBBs 816 based on the CBB configuration calculated at 812. Each CBG of a plurality of CBGs may be associated with a subset of the set of CBBs 816, for example the CBG 604 of the group of CBGs that include the CBG 604 and the CBG 606 in FIG. 6A may be associated with the CBB 608 and the CBB 610 of the group of CBBs that include the CBB 608, the CBB 610, the CBB 612, and the CBB 614. Each CBB of the set of CBBs 816 may be associated with exactly one of the plurality of CBGs, for example as the CBB 608 is associated with CBG 604 and not CBG 606, and the CBB 610 is associated with CBG 604 and not CBG 606. Moreover, 1206 may be performed by the component 198 in FIG. 1, 3, or 15.

At 1208, the UE may calculate the CBB configuration based on the CBB grouping algorithm indicator by associating each CB of a third plurality of CBs with one CBB of a first plurality of CBBs. The CBB grouping algorithm indicator may indicate the UE to associate CBs with CBBs before associating the CBBs with CBGs. For example, 1208 may be performed by the UE 802 in FIG. 8, which may, at 812, associate each CB of a set of CBs to transmit to the network node 804 with one CBB of the set of CBBs 816 to transmit to the network node 804. The CBB grouping algorithm indicator 810 may indicate for the UE 802 to associate CBs of the set of CBs to transmit to the network node 804 with CBBs before associating the CBBs with CBGs. For example, the UE 802 may associate a subset of the set of CBs 602 in FIG. 6B with the CBB 652 before assigning the CBB 652 to the CBG 660. Moreover, 1208 may be performed by the component 198 in FIG. 1, 3, or 15.

At 1210, the UE may calculate the CBB configuration based on the CBB grouping algorithm indicator by associating each CBB of the first plurality of CBBs with one CBG of a second plurality of CBGs. The CBB grouping algorithm indicator may indicate the UE to associate CBs with CBBs before associating the CBBs with CBGs. For example, 1210 may be performed by the UE 802 in FIG. 8, which may associate each CBB of the set of CBBs 816 with one CBG of a set of CBGs to transmit to the network node 804. The CBB grouping algorithm indicator 810 may indicate for the UE 802 to associate CBs of the set of CBs to transmit to the network node 804 with CBBs before associating the CBBs with CBGs. For example, the UE 802 may associate a subset of the set of CBs 602 in FIG. 6B with the CBB 652 before assigning the CBB 652 to the CBG 660. Moreover, 1210 may be performed by the component 198 in FIG. 1, 3, or 15.

At 1212, the UE may associate each CB of the third plurality of CBs with one CBB of a first plurality of CBBs by associating each CB of the third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one. For example, 1212 may be performed by the UE 802 in FIG. 8, which may evenly split the set of CBs to transmit to the network node 804 into the set of CBBs 816 such that the number of CBs associated with each CBB differs by at most one CB from any other CBB of the set of CBBs 816. Moreover, 1212 may be performed by the component 198 in FIG. 1, 3, or 15.

At 1214, the UE may associate each CBB of the first plurality of CBBs with one CBG of the second plurality of CBGs by associating each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one. For example, 1214 may be performed by the UE 802 in FIG. 8, which may evenly distribute the CBBs of the set of CBBs 816 to a set of CBGs such that each CBG differs by at most one CBB from any other CBG. Moreover, 1214 may be performed by the component 198 in FIG. 1, 3, or 15.

At 1216, the UE may interleave CBs associated with the CBB. For example, 1216 may be performed by the UE 802 in FIG. 8, which may, at 814, interleave CBs associated with one CBB of the set of CBBs 816, similar to the interleaving illustrated in FIG. 4. Moreover, 1216 may be performed by the component 198 in FIG. 1, 3, or 15.

At 1218, the UE may transmit the first plurality of CBBs based on the calculated CBB configuration by transmitting the interleaved CBs. For example, 1218 may be performed by the UE 802 in FIG. 8, which may transmit the set of CBBs 816 as interleaved CBs such that each CBB is transmitted as interleaved CBs of the CBB. Moreover, 1218 may be performed by the component 198 in FIG. 1, 3, or 15.

Figure 13:
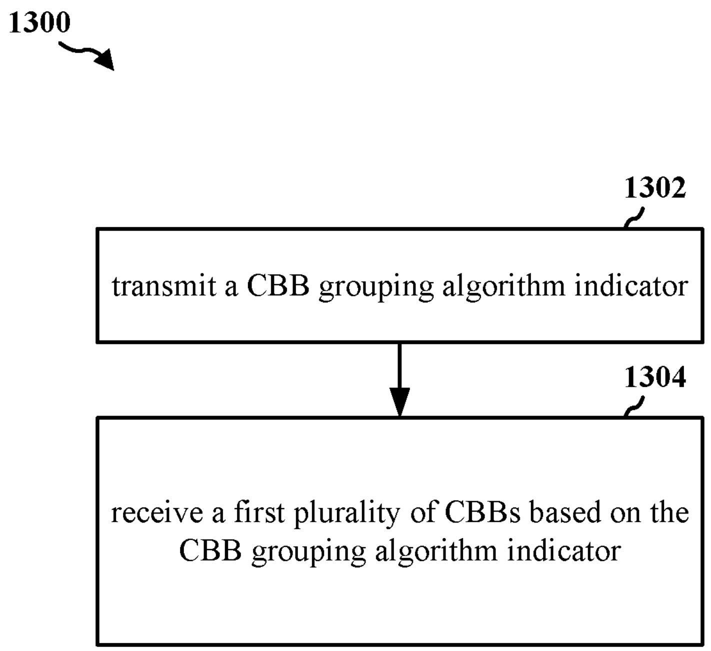
FIG. 13 is a flowchart of a method of wireless communication.

FIG. 13 is a flowchart 1300 of a method of wireless communication. The method may be performed by a base station (e.g., the base station 102, the base station 310; the network node 804; the network entity 1502, the network entity 1602, the network entity 1760). At 1302, the network node may transmit a CBB grouping algorithm indicator. For example, 1302 may be performed by the network node 804 in FIG. 8, which may transmit the CBB grouping algorithm indicator 810 to the UE 802. Moreover, 1302 may be performed by the component 199 in FIG. 1, 3, 16, or 17.

At 1304, the network node may receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs. For example, 1304 may be performed by the network node 804 in FIG. 8, which may receive the set of CBBs 816 from the UE 802 based on the CBB grouping algorithm indicator 810. Each CBG of a second plurality of CBGs may be associated with a subset of the first plurality of CBBs. For example, the CBG 604 of the group of CBGs that include the CBG 604 and the CBG 606 in FIG. 6A may be associated with the CBB 608 and the CBB 610 of the group of CBBs that include the CBB 608, the CBB 610, the CBB 612, and the CBB 614. Each CBB of the first plurality of CBBs may be associated with exactly one of the second plurality of CBGs. For example, the CBB 608 in FIG. 6A is associated with CBG 604 and not CBG 606, and the CBB 610 is associated with CBG 604 and not CBG 606. Moreover, 1304 may be performed by the component 199 in FIG. 1, 3, 16, or 17.

Figure 14:
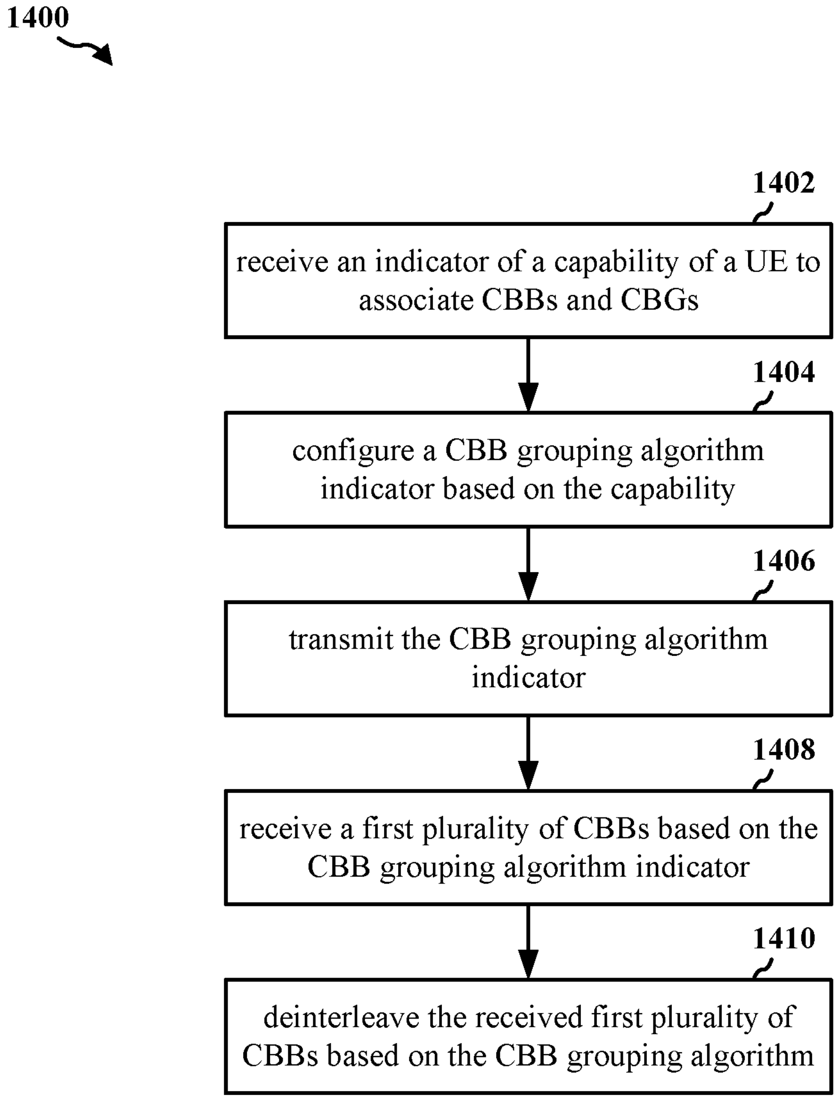
FIG. 14 is a flowchart of a method of wireless communication.

FIG. 14 is a flowchart 1400 of a method of wireless communication. The method may be performed by a base station (e.g., the base station 102, the base station 310; the network node 804; the network entity 1502, the network entity 1602, the network entity 1760).

At 1402, the network node may receive an indicator of a capability of a UE to associate CBBs and CBGs. The indicator may indicate a processing time for the UE to encode a number of CBs associated with one of the first plurality of CBBs. The indicator may indicate a buffer associated with an encoding of CBs associated with one of the first plurality of CBBs. The indicator may indicate a delay associated with the encoding of CBs associated with one of the first plurality of CBBs. The indicator may indicate a maximum number of CBs that the UE is able to associate with one of the first plurality of CBBs. For example, 1402 may be performed by the network node 804 in FIG. 8, which may receive the UE capability 806 from the UE 802. The UE capability 806 may include an indicator of a capability of the UE 802 to associate CBBs and CBGs. The indicator may indicate an estimated maximum processing time for the UE 802 to use to encode CBs of a CBB. The indicator may indicate a buffer size that the UE 802 uses to encode CBs of a CBB. The indicator may indicate an estimated maximum delay for the UE 802 to encode CBs of a CBB. The indicator may indicate a maximum number of CBs that the UE 802 is able to associate with a single CBB (e.g., a maximum number of CBs that can be interleaved for transmission of an interleaved CBB). Moreover, 1402 may be performed by the component 199 in FIG. 1, 3, 16, or 17.

At 1404, the network node may configure a CBB grouping algorithm indicator based on the capability. For example, 1404 may be performed by the network node 804 in FIG. 8, which may, at 808, configure the CBB grouping algorithm indicator 810 based on one or more indicators of the UE capability 806 (e.g., ensuring that the UE 802 is capable of adapting the algorithm without negatively influencing performance). Moreover, 1404 may be performed by the component 199 in FIG. 1, 3, 16, or 17.

At 1406, the network node may transmit the CBB grouping algorithm indicator. For example, 1406 may be performed by the network node 804 in FIG. 8, which may transmit the CBB grouping algorithm indicator 810 to the UE 802. Moreover, 1406 may be performed by the component 199 in FIG. 1, 3, 16, or 17.

At 1408, the network node may receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs. For example, 1408 may be performed by the network node 804 in FIG. 8, which may receive the set of CBBs 816 from the UE 802 based on the CBB grouping algorithm indicator 810. Each CBG of a second plurality of CBGs may be associated with a subset of the first plurality of CBBs. For example, the CBG 604 of the group of CBGs that include the CBG 604 and the CBG 606 in FIG. 6A may be associated with the CBB 608 and the CBB 610 of the group of CBBs that include the CBB 608, the CBB 610, the CBB 612, and the CBB 614. Each CBB of the first plurality of CBBs may be associated with exactly one of the second plurality of CBGs. For example, the CBB 608 in FIG. 6A is associated with CBG 604 and not CBG 606, and the CBB 610 is associated with CBG 604 and not CBG 606. Moreover, 1408 may be performed by the component 199 in FIG. 1, 3, 16, or 17.

At 1410, the network node may deinterleave the received first plurality of CBBs based on the CBB grouping algorithm. For example, 1410 may be performed by the network node 804 in FIG. 8, which may, at 818, deinterleave the set of CBBs 816 received from the UE 802. Moreover, 1410 may be performed by the component 199 in FIG. 1, 3, 16, or 17.

Figure 15:
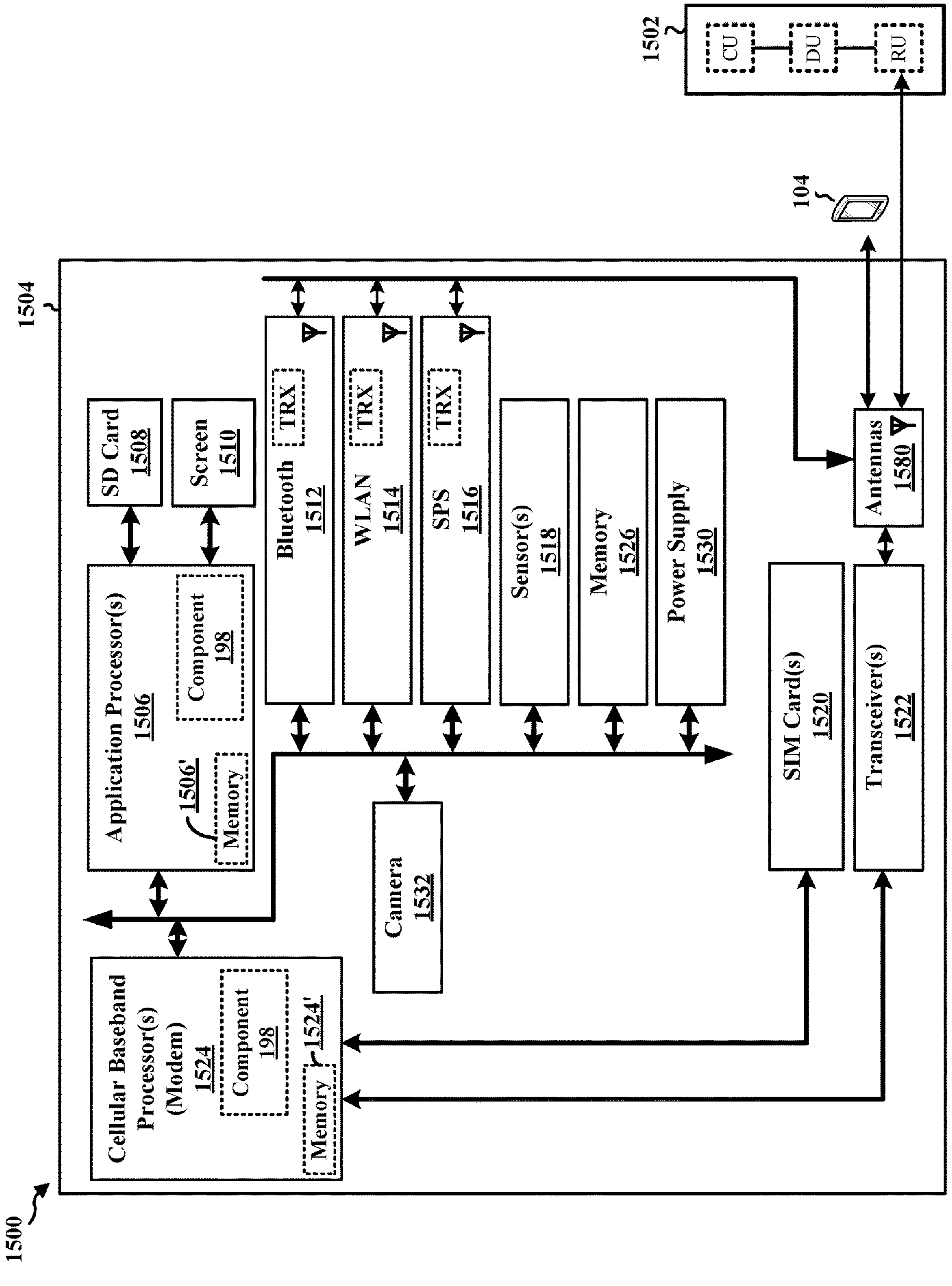
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1104 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor (s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

Figure 16:
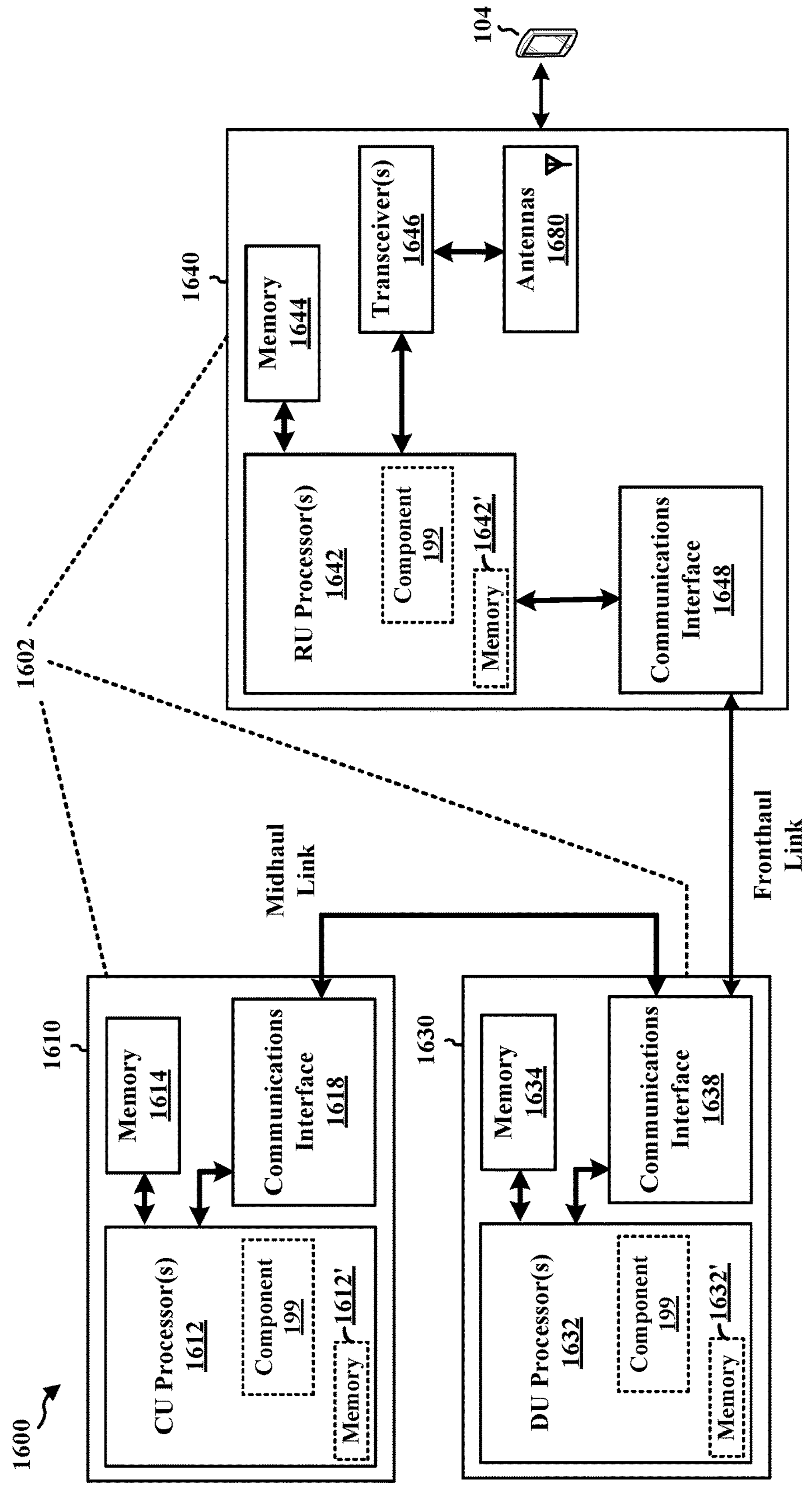
FIG. 16 is a diagram illustrating an example of a hardware implementation for an example network entity.

As discussed supra, the component 198 may be configured to receive a CBB grouping algorithm indicator. The component 198 may be configured to calculate a CBB configuration based on the CBB grouping algorithm indicator. The component 198 may be configured to transmit a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. The component 198 may be within the cellular baseband processor(s) 1524, the application processor(s) 1506, or both the cellular baseband processor(s) 1524 and the application processor(s) 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for receiving a CBB grouping algorithm indicator. The apparatus 1504 may include means for calculating a CBB configuration based on the CBB grouping algorithm indicator. The apparatus 1504 may include means for transmitting a first plurality of CBBs based on the calculated CBB configuration. Each CBG of a second plurality of CBGs may be associated with a subset of the first plurality of CBBs. Each CBB of the first plurality of CBBs may be associated with exactly one of the second plurality of CBGs. The CBB grouping algorithm indicator may indicate the apparatus 1504 to associate CBs with CBGs before associating the CBGs with CBBs. The apparatus 1504 may include means for calculating the CBB configuration based on the CBB grouping algorithm indicator by (a) associating each CB of a third plurality of CBs with one CBG of the second plurality of CBGs, and (b) associating each CBG of the second plurality of CBGs with one subset of CBBs of the first plurality of CBBs after the association of each CB of the third plurality of CBs with one CBG of the second plurality of CBGs. The apparatus 1504 may include means for calculating a first number of CBs associated with a first CBB of the first plurality CBBs based on a second number of CBs associated with a first CBG of the second plurality of CBGs. The apparatus 1504 may include means for associating each CB of the third plurality of CBs with one CBG of the second plurality of CBGs by associating each CB of the third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one. The apparatus 1504 may include means for associating each CBG of the second plurality of CBGs with one subset of CBBs of the first plurality of CBBs by associating each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one. The CBB grouping algorithm indicator may indicate the apparatus 1504 to associate CBs with CBBs before associating the CBBs with CBGs. The apparatus 1504 may include means for calculating the CBB configuration based on the CBB grouping algorithm indicator by (a) associating each CB of a third plurality of CBs with one CBB of the first plurality of CBBs, and (b) associating each CBB of the first plurality of CBBs with one CBG of the second plurality of CBGs after the association of each CB of the third plurality of CBs with one CBB of the first plurality of CBBs. The apparatus 1504 may include means for associating each CB of the third plurality of CBs with one CBB of the first plurality of CBBs by associating each CB of the third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one. The apparatus 1504 may include means for associating each CBB of the first plurality of CBBs with one CBG of the second plurality of CBGs by associating each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one. The apparatus 1504 may include means for transmitting an indicator of a capability of the UE to associate CBBs and CBGs before the reception of the CBB grouping algorithm indicator. The indicator may indicate a processing time for the apparatus 1504 to encode a number of CBs associated with one of the first plurality of CBBs. The indicator may indicate a buffer associated with an encoding of CBs associated with one of the first plurality of CBBs. The indicator may indicate a delay associated with the encoding of CBs associated with one of the first plurality of CBBs. The indicator may indicate a maximum number of CBs that the apparatus 1504 is able to associate with one of the first plurality of CBBs. The apparatus 1504 may include means for transmitting the first plurality of CBBs based on the calculated CBB configuration by, for each CBB of the first plurality of CBBs, (a) interleaving CBs associated with the CBB, and (b) transmitting the interleaved CBs. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means. FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a CBB grouping algorithm indicator. The component 199 may be configured to receive a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1602 may include a variety of components configured for various functions. In one configuration, the network entity 1602 may include means for transmitting a CBB grouping algorithm indicator. The network entity 1602 may include means for receiving a first plurality of CBBs based on the CBB grouping algorithm indicator. Each CBG of a second plurality of CBGs may be associated with a subset of the first plurality of CBBs. Each CBB of the first plurality of CBBs may be associated with exactly one of the second plurality of CBGs. The CBB grouping algorithm indicator may indicate a UE to associate CBs with CBGs before associating the CBGs with CBBs. The CBB grouping algorithm indicator may further indicate the UE to calculate a first number of CBs associated with a first CBB of the first plurality of CBBs based on a second number of CBs associated with a first CBG of the second plurality of CBGs. The CBB grouping algorithm indicator may further indicate the UE to associate each CB of a third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one. The CBB grouping algorithm indicator may further indicate the UE to associate each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one. The CBB grouping algorithm indicator may indicate a UE to associate CBs with CBBs before associating the CBBs with CBGs. The CBB grouping algorithm indicator may further indicate the UE to associate each CB of a third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one. The CBB grouping algorithm indicator may further indicate the UE to associate each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one. The network entity 1602 may include means for receiving an indicator of a capability of a UE to associate CBBs and CBGs. The network entity 1602 may include means for configuring the CBB grouping algorithm indicator based on the capability. The indicator may indicate a processing time for the UE to encode a number of CBs associated with one of the first plurality of CBBs. The indicator may indicate a buffer associated with an encoding of CBs associated with one of the first plurality of CBBs. The indicator may indicate a delay associated with the encoding of CBs associated with one of the first plurality of CBBS. The indicator may indicate a maximum number of CBs that the UE is able to associate with one of the first plurality of CBBs. The network entity 1602 may include means for receiving the first plurality of CBBs based on the CBB grouping algorithm indicator by, for each of the first plurality of CBBs, receiving interleaved CBs of one of the first plurality of CBBs. The network entity 1602 may include means for deinterleaving the received first plurality of CBBs based on the CBB grouping algorithm. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Figure 17:
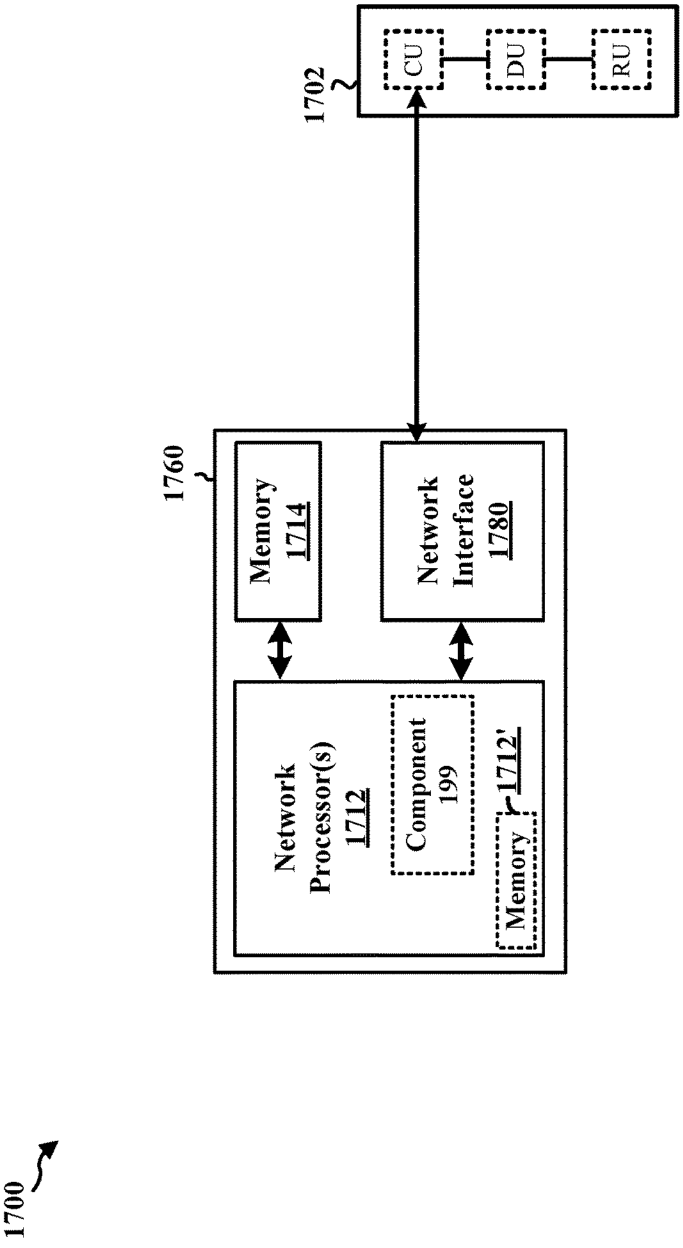
FIG. 17 is a diagram illustrating an example of a hardware implementation for an example network entity.

FIG. 17 is a diagram 1700 illustrating an example of a hardware implementation for a network entity 1760. In one example, the network entity 1760 may be within the core network 120. The network entity 1760 may include at least one network processor 1712. The network processor(s) 1712 may include on-chip memory 1712'. In some aspects, the network entity 1760 may further include additional memory modules 1714. The network entity 1760 communicates via the network interface 1780 directly (e.g., backhaul link) or indirectly (e.g., through a RIC) with the CU 1702. The on-chip memory 1712' and the additional memory modules 1714 may each be considered a computer-readable medium/memory. Each computer-readable medium/memory may be non-transitory. The network processor(s) 1712 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a CBB grouping algorithm indicator. The component 199 may be configured to receive a first plurality of CBBs based on the CBB grouping algorithm indicator. Each of the first plurality of CBBs may include a set of CBs. Each of the set of CBs of one of the first plurality of CBBs may be associated with exactly one of a second plurality of CBGs. The component 199 may be configured to receive the first plurality of CBBs based on the CBB grouping algorithm indicator by receiving interleaved CBs of each of the first plurality of CBBs. The component 199 may be configured to deinterleave the received interleaved CBs for each of the first plurality of CBBs. The component 199 may be within the network processor(s) 1712. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1760 may include a variety of components configured for various functions. In one configuration, the network entity 1760 may include means for transmitting a CBB grouping algorithm indicator. The means may be the component 199 of the network entity 1760 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, may send the data to a component of the device that transmits the data, or may send the data to a component of the device. A device configured to "obtain" data, such as a transmission, signal, or message, may receive, for example with a transceiver, may obtain the data from a component of the device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a code block bundle (CBB) grouping algorithm indicator; calculating a CBB configuration based on the CBB grouping algorithm indicator; and transmitting a first plurality of CBBs based on the calculated CBB configuration, wherein each code block group (CBG) of a second plurality of CBGs is associated with a subset of the first plurality of CBBs, wherein each CBB of the first plurality of CBBs is associated with exactly one of the second plurality of CBGs.

Aspect 2 is the method of aspect 1, wherein the CBB grouping algorithm indicator indicates the UE to associate code blocks (CBs) with CBGs before associating the CBGs with CBBs, wherein calculating the CBB configuration based on the CBB grouping algorithm indicator comprises: associating each CB of a third plurality of CBs with one CBG of the second plurality of CBGs; and associating each CBG of the second plurality of CBGs with one subset of CBBs of the first plurality of CBBs after the association of each CB of the third plurality of CBs with one CBG of the second plurality of CBGs.

Aspect 3 is the method of aspect 2, further comprising calculating a first number of CBs associated with a first CBB of the first plurality CBBs based on a second number of CBs associated with a first CBG of the second plurality of CBGs.

Aspect 4 is the method of either of aspects 2 or 3, wherein associating each CB of the third plurality of CBs with one CBG of the second plurality of CBGs comprises associating each CB of the third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one.

Aspect 5 is the method of any of aspects 2 to 4, wherein associating each CBG of the second plurality of CBGs with one subset of CBBs of the first plurality of CBBs comprises associating each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one.

Aspect 6 is the method of any of aspects 1 to 5, wherein the CBB grouping algorithm indicator indicates the UE to associate code blocks (CBs) with CBBs before associating the CBBs with CBGs, wherein calculating the CBB configuration based on the CBB grouping algorithm indicator comprises: associating each CB of a third plurality of CBs with one CBB of the first plurality of CBBs; and associating each CBB of the first plurality of CBBs with one CBG of the second plurality of CBGs after the association of each CB of the third plurality of CBs with one CBB of the first plurality of CBBs.

Aspect 7 is the method of aspect 6, wherein associating each CB of the third plurality of CBs with one CBB of the first plurality of CBBs comprises associating each CB of the third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one.

Aspect 8 is the method of either of aspects 6 or 7, wherein associating each CBB of the first plurality of CBBs with one CBG of the second plurality of CBGs comprises associating each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one.

Aspect 9 is the method of any of aspects 1 to 8, further comprising transmitting an indicator of a capability of the UE to associate CBBs and CBGs before the reception of the CBB grouping algorithm indicator.

Aspect 10 is the method of aspect 9, wherein the indicator indicates at least one of: a processing time for the UE to encode a number of code blocks (CBs) associated with one of the first plurality of CBBs; a buffer associated with an encoding of CBs associated with one of the first plurality of CBBs; a delay associated with the encoding of CBs associated with one of the first plurality of CBBs; or a maximum number of CBs that the UE is able to associate with one of the first plurality of CBBs.

Aspect 11 is the method of any of aspects 1 to 10, wherein transmitting the first plurality of CBBs based on the calculated CBB configuration comprises, for each CBB of the first plurality of CBBs: interleaving code blocks (CBs) associated with the CBB; and transmitting the interleaved CBs.

Aspect 12 is a method of wireless communication at a network node, comprising: transmitting a code block bundle (CBB) grouping algorithm indicator; and receiving a first plurality of CBBs based on the CBB grouping algorithm indicator, wherein each code block group (CBG) of a second plurality of CBGs is associated with a subset of the first plurality of CBBs, wherein each CBB of the first plurality of CBBs is associated with exactly one of the second plurality of CBGs.

Aspect 13 is the method of aspect 12, wherein the CBB grouping algorithm indicator indicates a user equipment (UE) to associate code blocks (CBs) with CBGs before associating the CBGs with CBBs.

Aspect 14 is the method of aspect 13, wherein the CBB grouping algorithm indicator further indicates the UE to calculate a first number of CBs associated with a first CBB of the first plurality of CBBs based on a second number of CBs associated with a first CBG of the second plurality of CBGs.

Aspect 15 is the method of either of aspects 13 to 14, wherein the CBB grouping algorithm indicator further indicates the UE to associate each CB of a third plurality of CBs with one CBG of the second plurality of CBGs such that a first number of CBs associated with a first CBG of the second plurality of CBGs does not differ from a second number of CBs associated with any CBG, that is not the first CBG, of the second plurality of CBGs by more than one.

Aspect 16 is the method of any of aspects 13 to 15, wherein the CBB grouping algorithm indicator further indicates the UE to associate each CBG of the second plurality of CBGs with one subset of CBBs of the first plurality of CBBs such that a first number of CBs associated with a first CBB of a first CBG of the second plurality of CBGs does not differ from a second number of CBs associated with any CBB, that is not the first CBB, of the first CBG of the second plurality of CBGs by more than one.

Aspect 17 is the method of any of aspects 12 to 16, wherein the CBB grouping algorithm indicator indicates a user equipment (UE) to associate code blocks (CBs) with CBBs before associating the CBBs with CBGs.

Aspect 18 is the method of aspect 17, wherein the CBB grouping algorithm indicator further indicates the UE to associate each CB of a third plurality of CBs with one CBB of the first plurality of CBBs such that a first number of CBs associated with a first CBB of the first plurality of CBBs does not differ from a second number of CBs associated with any CBB, that is not the first CBB, of the first plurality of CBBs by more than one.

Aspect 19 is the method of either of aspects 17 or 18, wherein the CBB grouping algorithm indicator further indicates the UE to associate each CBB of the first plurality of CBBs with one CBG of the second plurality of CBGs such that a first number of CBBs associated with a first CBG of the second plurality of CBGs does not differ from a second number of CBBs associated with any CBG, that is not the first CBG, of the second plurality of CBGs by more than one.

Aspect 20 is the method of any of aspects 12 to 19, further comprising: receiving an indicator of a capability of a user equipment (UE) to associate CBBs and CBGs; and configuring the CBB grouping algorithm indicator based on the capability.

Aspect 21 is the method of aspect 20, wherein the indicator indicates at least one of: a processing time for the UE to encode a number of code blocks (CBs) associated with one of the first plurality of CBBs; a buffer associated with an encoding of CBs associated with one of the first plurality of CBBs; a delay associated with the encoding of CBs associated with one of the first plurality of CBBs; or a maximum number of CBs that the UE is able to associate with one of the first plurality of CBBs.

Aspect 22 is the method of any of aspects 12 to 21, wherein receiving the first plurality of CBBs based on the CBB grouping algorithm indicator comprises, for each of the first plurality of CBBs, receiving interleaved code blocks (CBs) of one of the first plurality of CBBs.

Aspect 23 is the method of any of aspects 12 to 22, further comprising deinterleaving the received first plurality of CBBs based on the CBB grouping algorithm.

Aspect 24 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 23.

Aspect 25 is an apparatus for wireless communication, comprising means for performing each step in the method of any of aspects 1 to 23.

Aspect 26 is the apparatus of any of aspects 1 to 23, further comprising a transceiver (e.g., functionally connected to the at least one processor of Aspect 24) configured to receive or to transmit in association with the method of any of aspects 1 to 23.

Aspect 27 is a computer-readable medium (e.g., a non-transitory computer-readable medium) storing computer executable code, the code when executed by at least one processor causes the at least one processor, individually or in any combination, to perform the method of any of aspects 1 to 23.

What is claimed is:

1. An apparatus for wireless communication at a user equipment (UE), comprising:

at least one memory; and at least one processor coupled to the at least one memory and, based at least in part on information stored in the at least one memory, the at least one processor, individually or in any combination, is configured to:

receive a code block bundle (CBB) grouping algorithm indicator;

calculate a CBB configuration based on the CBB grouping algorithm indicator; and transmit a plurality of CBBs based on the calculated CBB configuration, wherein each code block group (CBG) of a plurality of CBGs is associated with a subset of the plurality of CBBs, wherein each CBB of the plurality of CBBs is associated with exactly one of the plurality of CBGs, wherein the CBB grouping algorithm indicator indicates the UE to associate code blocks (CBs) with CBGs before associating the CBGs with CBBs, wherein, to calculate the CBB configuration comprises:

associating each CB of the plurality of CBs with one CBG of the plurality of CBGs; and associating each CBG of the plurality of CBGs with one subset of CBBs of the plurality of CBBs after the association of each CB of the plurality of CBs with the CBG of the plurality of CBGs.

2. The apparatus of claim 1, wherein the at least one processor, individually or in any combination, is further configured to:

calculate a first number of CBs associated with a first CBB of the first plurality CBBs based on a second number of CBs associated with a first CBG of the plurality of CBGs.

3. The apparatus of claim 1, wherein, to associate each CB of the plurality of CBs with one CBG of the plurality of CBGs, the at least one processor, individually or in any combination, is configured to:

associate each CB of the plurality of CBs with one CBG of the plurality of CBGs such that a first number of CBs associated with a first CBG of the plurality of CBGs does not differ from a second number of CBs associated with any CBG, that is not the first CBG, of the plurality of CBGs by more than one.

4. The apparatus of claim 1, wherein, to associate each CBG of the plurality of CBGs with one subset of CBBs of the plurality of CBBs, the at least one processor, individually or in any combination, is configured to:

associate each CBG of the plurality of CBGs with one subset of CBBs of the plurality of CBBs such that a first number of CBs associated with a first CBB of a first CBG of the plurality of CBGs does not differ from a second number of CBs associated with any CBB, that is not the first CBB, of the first CBG of the plurality of CBGs by more than one.

5. The apparatus of claim 1, wherein the CBB grouping algorithm indicator indicates the UE to associate code blocks (CBs) with CBBs before associating the CBBs with CBGs, wherein, to calculate the CBB configuration based on the CBB grouping algorithm indicator, the at least one processor, individually or in any combination, is configured to:

associate each CB of a plurality of CBs with one CBB of the plurality of CBBs; and associate each CBB of the plurality of CBBs with one CBG of the plurality of CBGs after the association of each CB of the plurality of CBs with one CBB of the plurality of CBBs.

6. The apparatus of claim 5, wherein, to associate each CB of the plurality of CBs with one CBB of the plurality of CBBs, the at least one processor, individually or in any combination, is configured to:

associate each CB of the plurality of CBs with one CBB of the plurality of CBBs such that a first number of CBs associated with a first CBB of the plurality of CBBs does not differ from a second number of CBs associated with any CBB, that is not the first CBB, of the plurality of CBBs by more than one.

7. The apparatus of claim 5, wherein, to associate each CBB of the plurality of CBBs with one CBG of the plurality of CBGs, the at least one processor, individually or in any combination, is configured to:

associate each CBB of the plurality of CBBs with one CBG of the plurality of CBGs such that a first number of CBBs associated with a first CBG of the plurality of CBGs does not differ from a second number of CBBs associated with any CBG, that is not the first CBG, of the plurality of CBGs by more than one.

8. The apparatus of claim 1, wherein the at least one processor, individually or in any combination, is further configured to:

transmit an indicator of a capability of the UE to associate CBBs and CBGs before the reception of the CBB grouping algorithm indicator.

9. The apparatus of claim 8, wherein the indicator indicates at least one of:

a processing time for the UE to encode a number of code blocks (CBs) associated with one of the plurality of CBBs;

a buffer associated with an encoding of CBs associated with one of the plurality of CBBs;

a delay associated with the encoding of CBs associated with one of the plurality of CBBs; or a maximum number of CBs that the UE is able to associate with one of the plurality of CBBs.

10. The apparatus of claim 1, wherein, to transmit the plurality of CBBs based on the calculated CBB configuration, the at least one processor, individually or in any combination, is configured to, for each CBB of the plurality of CBBs:

interleave code blocks (CBs) associated with the CBB; and transmit the interleaved CBs.

11. The apparatus of claim 1, further comprising a transceiver coupled to the at least one processor, wherein the at least one processor, individually or in any combination, is further configured to:

receive, via the transceiver, the CBB grouping indicator; and transmit, via the transceiver, the plurality of CBBs.

12. An apparatus for wireless communication at a network node, comprising:

at least one memory; and at least one processor coupled to the at least one memory and, based at least in part on information stored in the at least one memory, the at least one processor, individually or in any combination, is configured to:

transmit a code block bundle (CBB) grouping algorithm indicator; and receive a plurality of CBBs based on the CBB grouping algorithm indicator, wherein each code block group (CBG) of a plurality of CBGs is associated with a subset of the plurality of CBBs, wherein each CBB of the plurality of CBBs is associated with exactly one of the plurality of CBGs and wherein the CBB grouping algorithm indicator indicates a user equipment (UE) to associate code blocks (CBs) with CBGs before associating the CBGs with CBBs and the UE to calculate a first number of CBs associated with a first CBB of the plurality of CBBs based on a second number of CBs associated with a first CBG of the plurality of CBGs.

13. The apparatus of claim 12, wherein the CBB grouping algorithm indicator further indicates the UE to associate each CB of a plurality of CBs with one CBG of the plurality of CBGs such that a first number of CBs associated with a first CBG of the plurality of CBGs does not differ from a second number of CBs associated with any CBG, that is not the first CBG, of the plurality of CBGs by more than one.

14. The apparatus of claim 12, wherein the CBB grouping algorithm indicator further indicates the UE to associate each CBG of the plurality of CBGs with one subset of CBBs of the plurality of CBBs such that a first number of CBs associated with a first CBB of a first CBG of the plurality of CBGs does not differ from a second number of CBs associated with any CBB, that is not the first CBB, of the first CBG of the plurality of CBGs by more than one.

15. The apparatus of claim 12, wherein the CBB grouping algorithm indicator indicates a user equipment (UE) to associate code blocks (CBs) with CBBs before associating the CBBs with CBGs.

16. The apparatus of claim 15, wherein the CBB grouping algorithm indicator further indicates the UE to associate each CB of a third plurality of CBs with one CBB of the plurality of CBBs such that a first number of CBs associated with a first CBB of the plurality of CBBs does not differ from a second number of CBs associated with any CBB, that is not the CBB, of the plurality of CBBs by more than one.

17. A method of wireless communication at a user equipment (UE), comprising:

receiving a code block bundle (CBB) grouping algorithm indicator;

calculating a CBB configuration based on the CBB grouping algorithm indicator; and transmitting a plurality of CBBs based on the calculated CBB configuration, wherein each code block group (CBG) of a plurality of CBGs is associated with a subset of the plurality of CBBs, wherein each CBB of the plurality of CBBs is associated with exactly one of the plurality of CBGs, wherein the CBB grouping algorithm indicator indicates the UE to associate code blocks (CBs) with CBGs before associating the CBGs with CBBs, wherein, to calculate the CBB configuration comprises:

associating each CB of the plurality of CBs with one CBG of the plurality of CBGs; and associating each CBG of the plurality of CBGs with one subset of CBBs of the plurality of CBBs after the association of each CB of the plurality of CBs with one CBG of the plurality of CBGs.

* * * * *